US007853112B2

(12) United States Patent
Zimmel et al.

(10) Patent No.: US 7,853,112 B2
(45) Date of Patent: Dec. 14, 2010

(54) FIBER OPTIC SPLITTER MODULE

(75) Inventors: Steven C. Zimmel, Minneapolis, MN (US); Trevor Smith, Eden Prairie, MN (US); Ponharith Nhep, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/557,937

(22) Filed: Sep. 11, 2009

(65) Prior Publication Data
US 2010/0158464 A1     Jun. 24, 2010

Related U.S. Application Data

(63) Continuation of application No. 12/229,511, filed on Aug. 22, 2008, now Pat. No. 7,606,459, which is a continuation of application No. 11/354,297, filed on Feb. 13, 2006, now Pat. No. 7,418,181.

(51) Int. Cl.
*G02B 6/00* (2006.01)
(52) U.S. Cl. .......................... 385/135; 385/88; 385/89; 385/92; 385/134; 385/76; 385/77; 385/78
(58) Field of Classification Search .................... 385/42, 385/88, 89, 92, 93, 94, 134, 135, 136, 137, 385/138, 139, 52, 53, 76, 77, 78, 100
See application file for complete search history.

(56) References Cited

U.S. PATENT DOCUMENTS

| 5,189,410 | A | 2/1993 | Kosugi et al. | 340/825.14 |
|---|---|---|---|---|
| 5,317,663 | A | 5/1994 | Beard et al. | 385/70 |
| 5,339,379 | A | 8/1994 | Kutsch et al. | 385/135 |
| 5,363,465 | A | 11/1994 | Korkowski et al. | 385/135 |
| 5,432,875 | A | 7/1995 | Korkowski et al. | 385/27 |
| 5,497,444 | A | 3/1996 | Wheeler | 385/135 |
| 5,627,925 | A | 5/1997 | Alferness et al. | 385/17 |
| 5,694,511 | A | 12/1997 | Pimpinella et al. | 385/134 |

(Continued)

FOREIGN PATENT DOCUMENTS

DE      202 01 170 U1      5/2002      ............... 385/53 X (Continued)

OTHER PUBLICATIONS

ADC Telecommunications, Inc., DSX-3 Digital Signal Cross-Connect, dated Oct. 2004, 65 pp.

(Continued)

*Primary Examiner*—Brian M Healy
(74) *Attorney, Agent, or Firm*—Merchant & Gould P.C.

(57) ABSTRACT

A telecommunications assembly includes a chassis and a plurality of fiber optic splitter modules mounted within the chassis. Each splitter module includes at least one fiber optic connector. Within an interior of the chassis are positioned at least one fiber optic adapter. Inserting the splitter module through a front opening of the chassis at a mounting location positions the connector of the splitter module for insertion into and mating with the adapter of the chassis. The adapters mounted within the interior of the chassis are integrally formed as part of a removable adapter assembly. A method of mounting a fiber optic splitter module within a telecommunications chassis is also disclosed.

7 Claims, 30 Drawing Sheets

U.S. PATENT DOCUMENTS

| | | | | |
|---|---|---|---|---|
| 5,701,380 | A | 12/1997 | Larson et al. | 385/134 |
| 5,717,810 | A | 2/1998 | Wheeler | 385/134 |
| 5,946,440 | A | 8/1999 | Puetz | 385/135 |
| 6,208,796 | B1 | 3/2001 | Vigliaturo | 385/135 |
| 6,226,111 | B1 | 5/2001 | Chang et al. | 359/119 |
| 6,263,136 | B1 | 7/2001 | Jennings et al. | 385/48 |
| 6,307,998 | B2 | 10/2001 | Vigliaturo | 385/135 |
| 6,363,183 | B1 | 3/2002 | Koh | 385/19 |
| 6,370,294 | B1 | 4/2002 | Pfeiffer et al. | 385/16 |
| 6,418,262 | B1 | 7/2002 | Puetz et al. | 385/134 |
| 6,424,781 | B1 | 7/2002 | Puetz et al. | 385/135 |
| 6,532,332 | B2 | 3/2003 | Solheid et al. | 385/134 |
| 6,535,682 | B1 | 3/2003 | Puetz et al. | 385/135 |
| 6,556,738 | B2 | 4/2003 | Pfeiffer et al. | 385/16 |
| 6,556,763 | B1 | 4/2003 | Puetz et al. | 385/135 |
| 6,591,051 | B2 | 7/2003 | Solheid et al. | 385/134 |
| 6,614,953 | B2 | 9/2003 | Strasser et al. | 385/17 |
| RE38,311 | E | 11/2003 | Wheeler | 385/135 |
| 6,647,197 | B1 | 11/2003 | Marrs et al. | 385/134 |
| 6,668,108 | B1 | 12/2003 | Helkey et al. | 385/18 |
| 6,760,531 | B1 | 7/2004 | Solheid et al. | 385/135 |
| 6,810,193 | B1 | 10/2004 | Müller | 385/135 |
| 6,822,874 | B1 | 11/2004 | Marler | 361/752 |
| 6,850,685 | B2 | 2/2005 | Tinucci et al. | 385/135 |
| 6,885,798 | B2 | 4/2005 | Zimmel | 385/100 |
| 7,142,764 | B2 | 11/2006 | Allen et al. | 385/135 |
| 7,190,874 | B1 | 3/2007 | Barth et al. | 385/135 |
| 7,194,181 | B2 | 3/2007 | Holmberg et al. | 385/135 |
| 7,418,181 | B2 | 8/2008 | Zimmel et al. | 385/135 |
| 2002/0181896 | A1 | 12/2002 | McClellan et al. | 385/88 |
| 2003/0132685 | A1 | 7/2003 | Sucharczuk et al. | 312/223.2 |
| 2003/0134541 | A1 | 7/2003 | Johnsen et al. | 439/668 |
| 2003/0147597 | A1 | 8/2003 | Duran | 385/76 |
| 2003/0202765 | A1 | 10/2003 | Franklin et al. | 385/135 |
| 2004/0240826 | A1 | 12/2004 | Daoud et al. | 385/135 |
| 2005/0053341 | A1 | 3/2005 | Zimmel | 385/111 |
| 2005/0067847 | A1 | 3/2005 | Zellak | 385/100 |
| 2005/0105879 | A1 | 5/2005 | Kanasaki et al. | 385/147 |
| 2005/0232550 | A1 | 10/2005 | Nakajima et al. | 385/60 |
| 2005/0232551 | A1 | 10/2005 | Chang et al. | 385/76 |
| 2005/0232565 | A1 | 10/2005 | Heggestad et al. | 385/135 |
| 2006/0083468 | A1 | 4/2006 | Kahle et al. | 385/72 |
| 2006/0093301 | A1 | 5/2006 | Zimmel et al. | 385/135 |
| 2007/0036503 | A1 | 2/2007 | Solheid et al. | 385/134 |
| 2007/0147765 | A1 | 6/2007 | Gniadek et al. | 385/135 |
| 2007/0189692 | A1 | 8/2007 | Zimmel et al. | 385/135 |
| 2009/0022468 | A1* | 1/2009 | Zimmel | 385/135 |
| 2009/0116806 | A1 | 5/2009 | Zimmel et al. | 385/135 |
| 2010/0158464 | A1* | 6/2010 | Zimmel et al. | 385/135 |

FOREIGN PATENT DOCUMENTS

| | | | |
|---|---|---|---|
| EP | 0 730 177 A2 | 9/1996 | 385/53 X |
| EP | 0 828 356 A2 | 3/1998 | 385/135 X |
| EP | 1 473 578 A2 | 11/2004 | 385/134 X |
| GB | 2 300 978 A | 11/1996 | 385/134 X |
| WO | WO 96/36896 | 11/1996 | 385/53 X |
| WO | WO 03/093889 A1 | 11/2003 | 385/135 X |
| WO | WO 2006/127397 A1 | 11/2006 | 385/135 X |

OTHER PUBLICATIONS

ADC Telecommunications, Inc., OmniReach FTTP Solutions, dated May 2004, 12 pp.

Pending U.S. Appl. No. 11/138,063, filed May 25, 2005, entitled "Fiber Optic Splitter Module".

Pending U.S. Appl. No. 11/138,889, filed May 25, 2005, entitled "Fiber Optic Adapter Module".

Prosecution History of U.S. Appl. No. 10/980,978 (OA Dec. 15, 2005; Resp. Jun. 15, 2006; OA Sep. 6, 2006; Resp. Mar. 6, 2007; OA Jun. 1, 2007).

Prosecution History of U.S. Appl. No. 11/138,063 (OA Dec. 27, 2006; Resp. Apr. 27, 2007; OA Jul. 30, 2007).

Prosecution History of U.S. Appl. No. 11/138,889 (OA Dec. 14, 2005; Resp. Jun. 14, 2006; OA Sep. 11, 2006; Resp. Mar. 12, 2007; OA Jun. 13, 2007).

Prosecution History of U.S. Appl. No. 11/215,837 (OA Jul. 28, 2006; Resp. Oct. 30, 2006; OA Jan. 26, 2007; Resp. Apr. 26, 2007; Notice of Allowance Aug. 2, 2007).

* cited by examiner

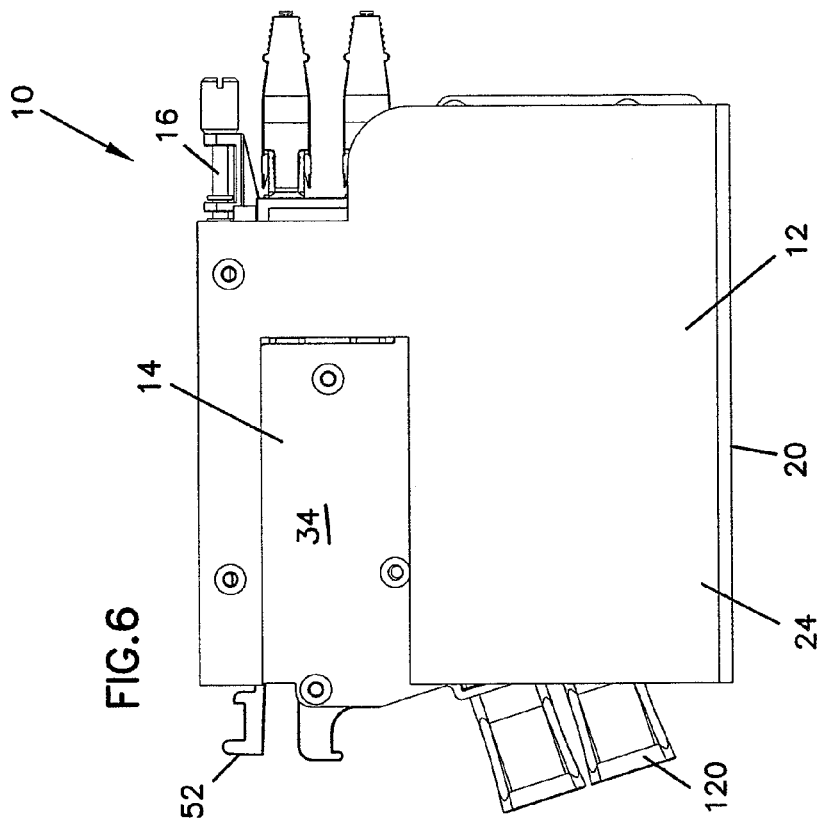
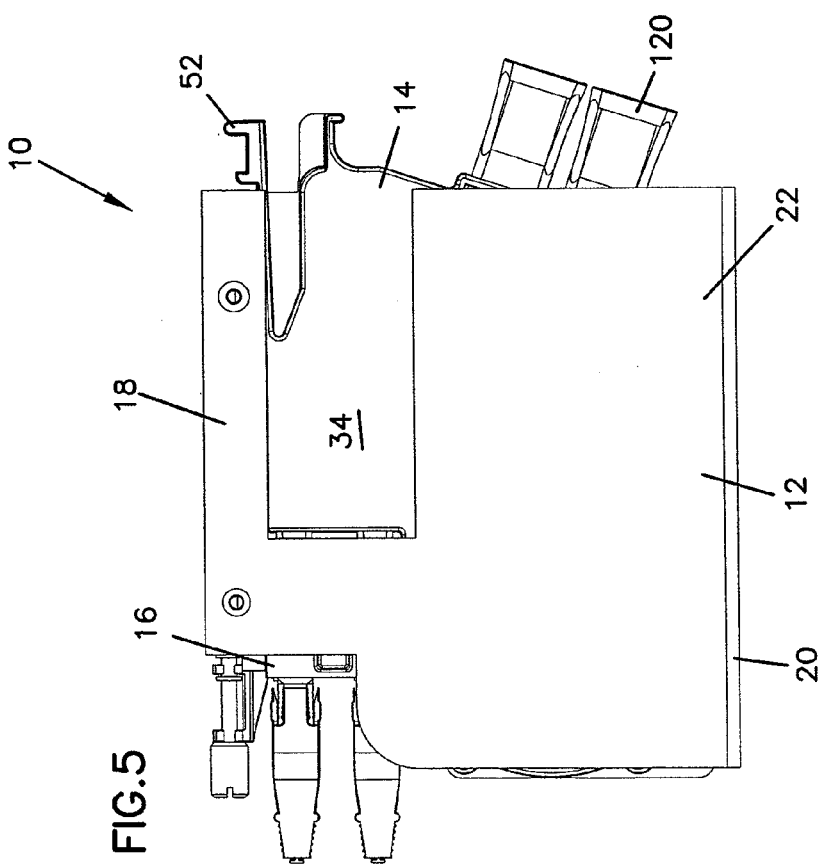

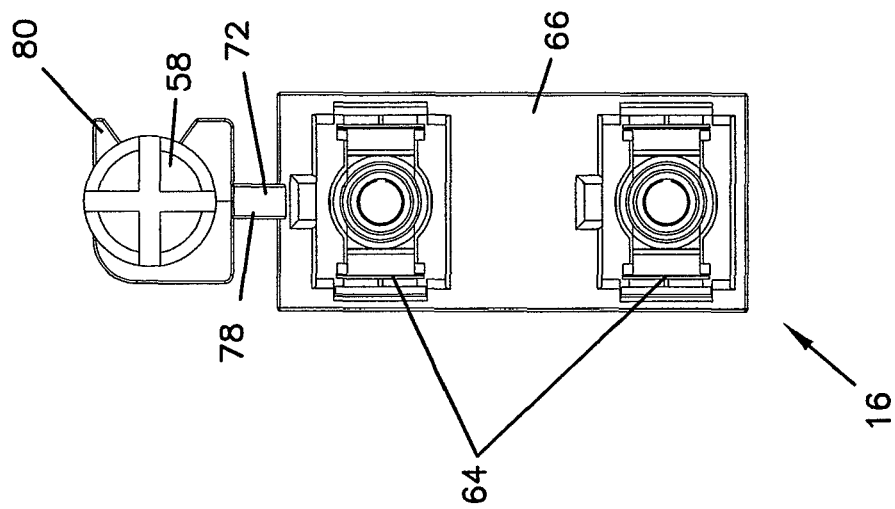
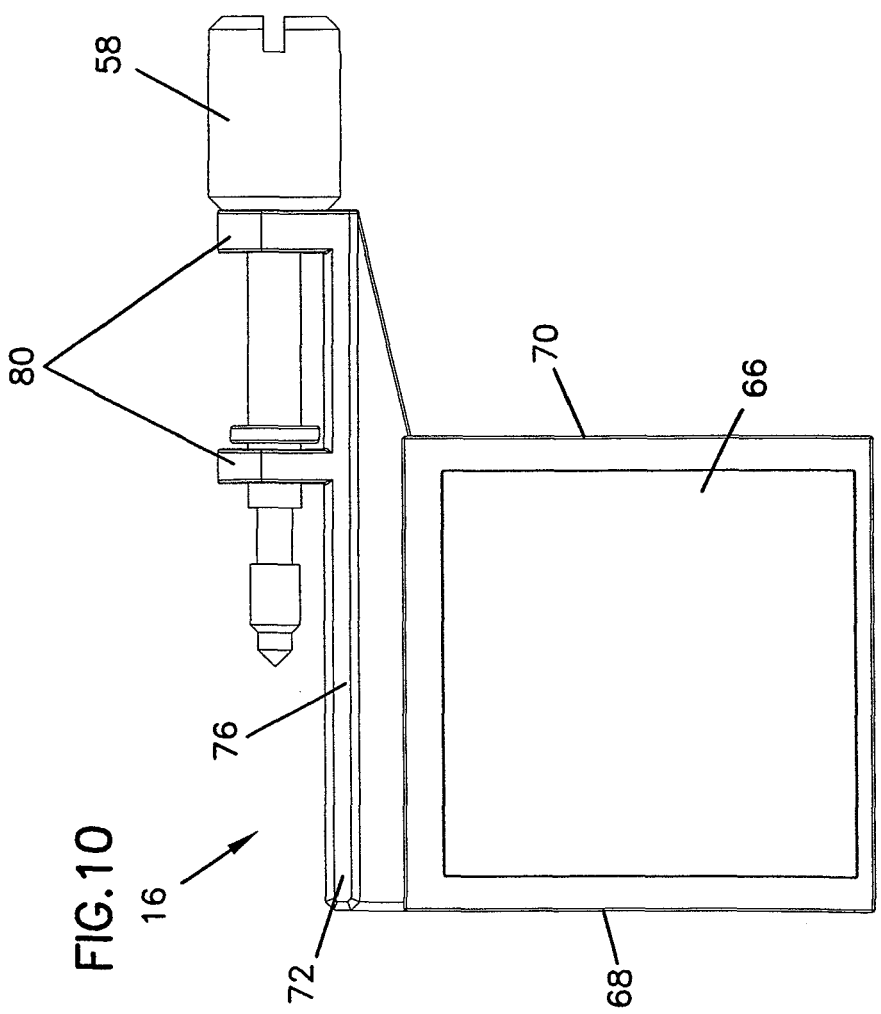

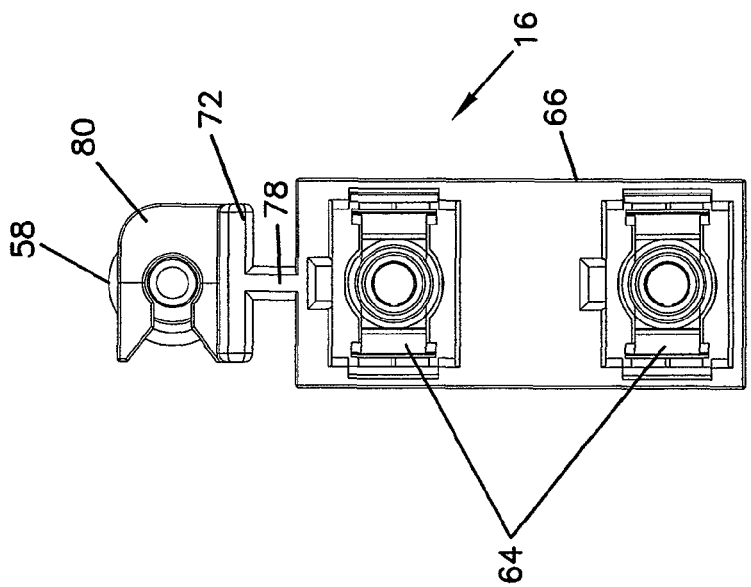
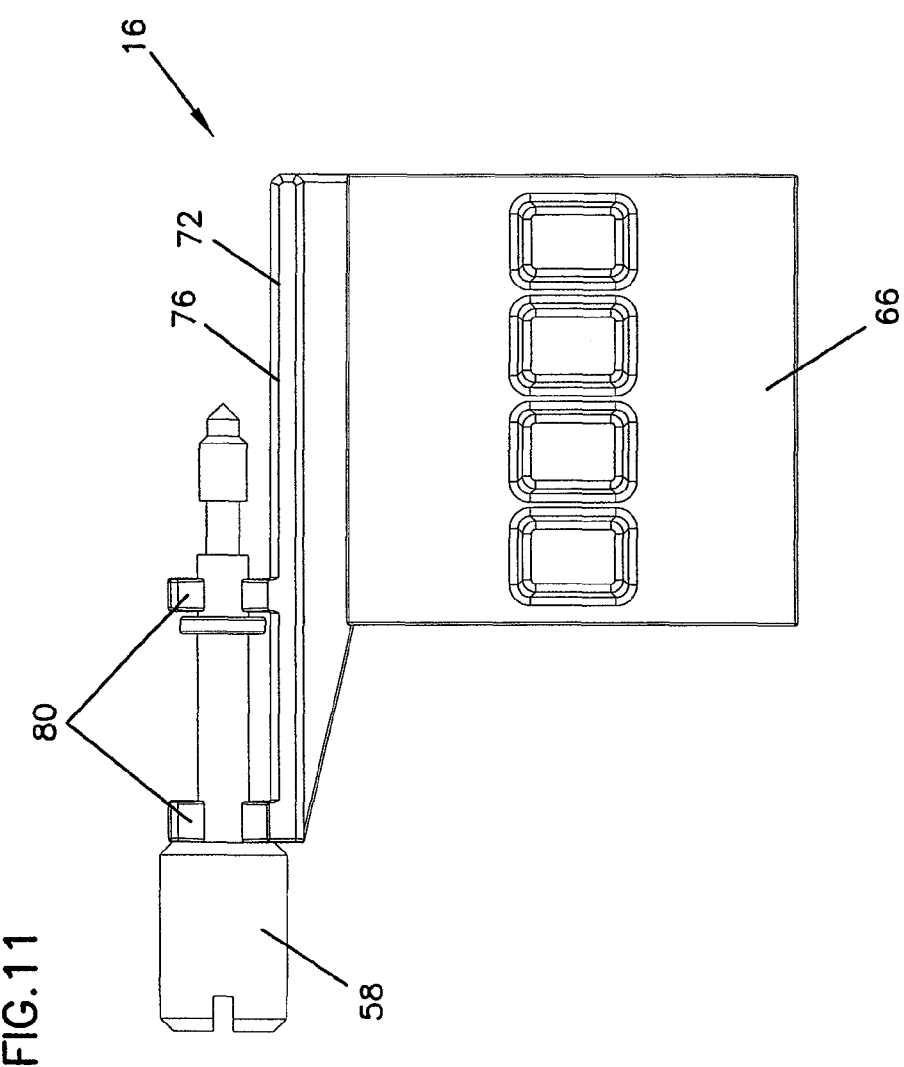

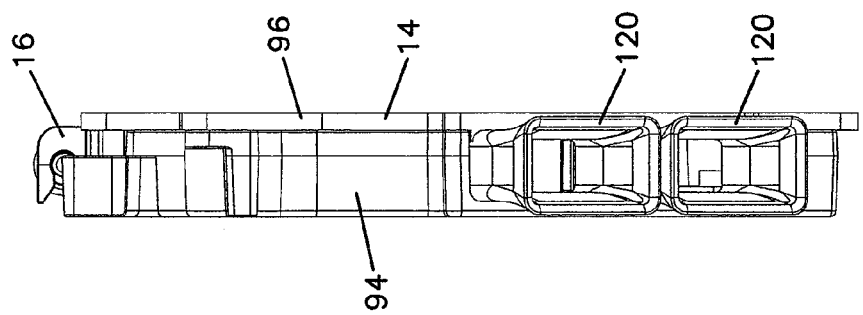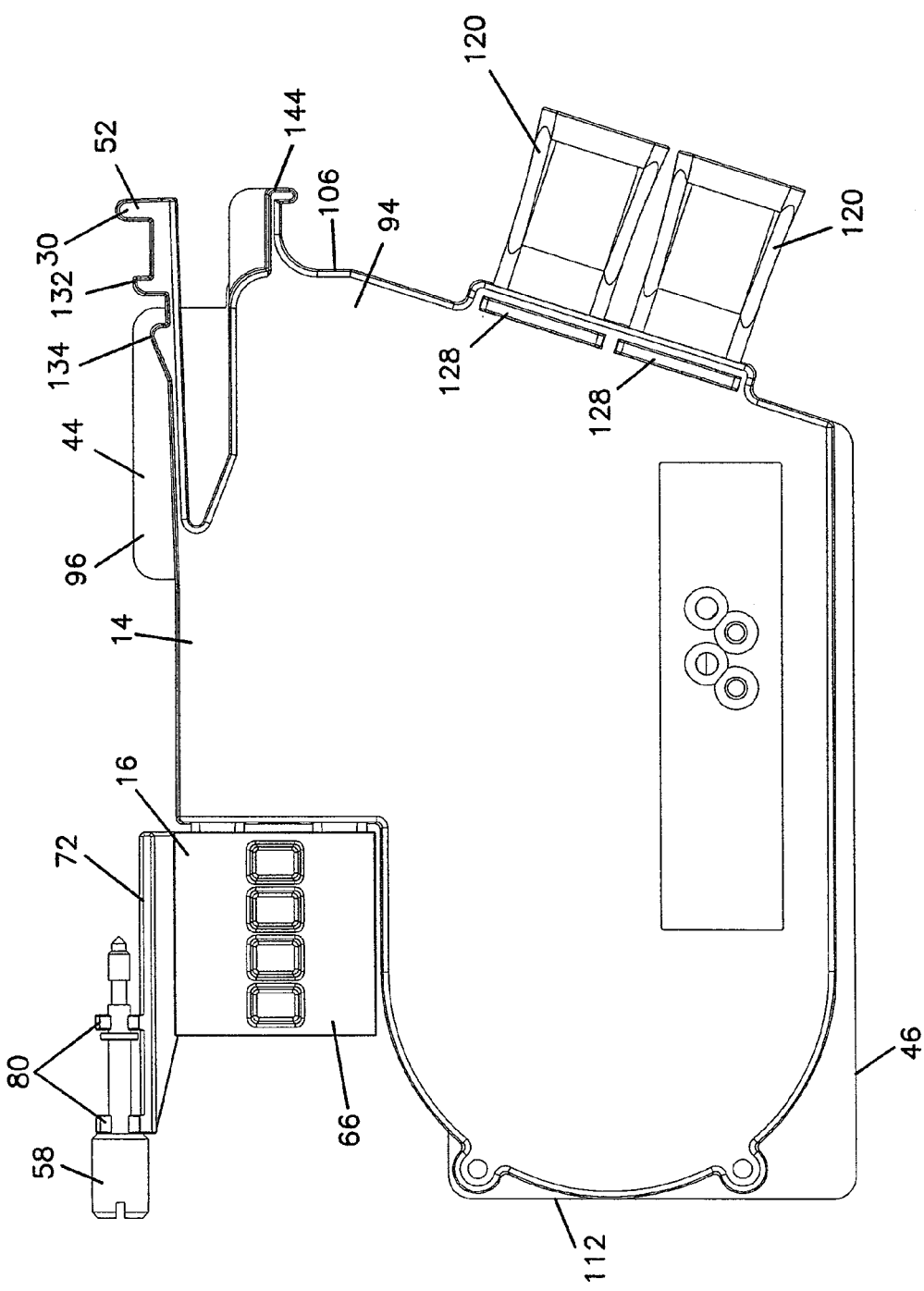

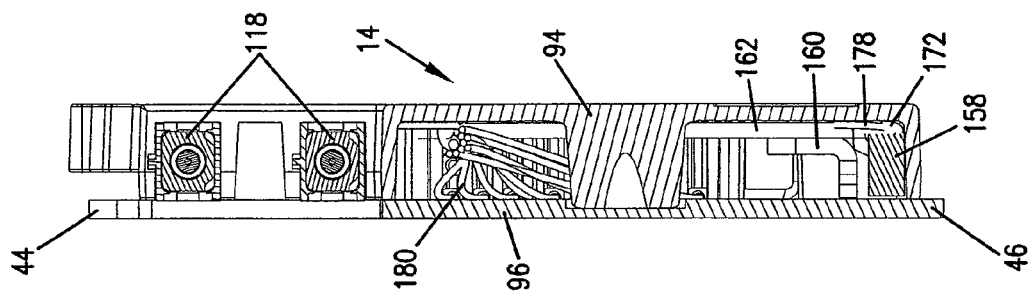
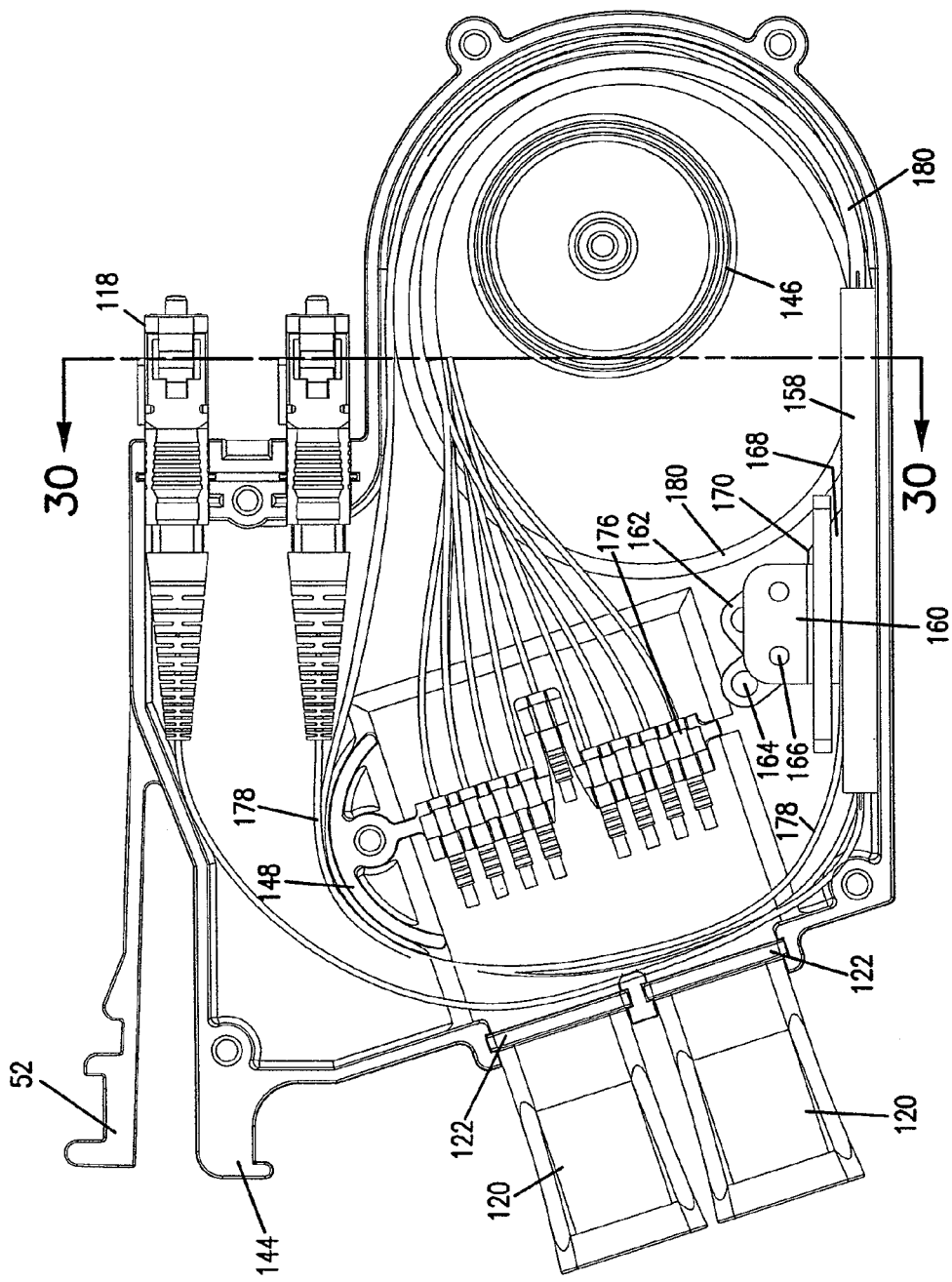

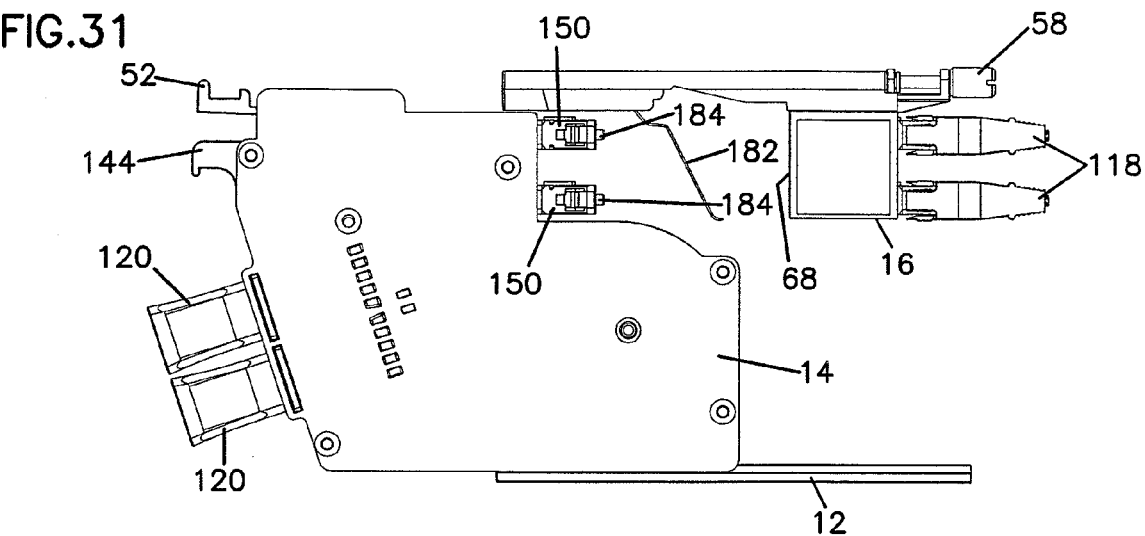
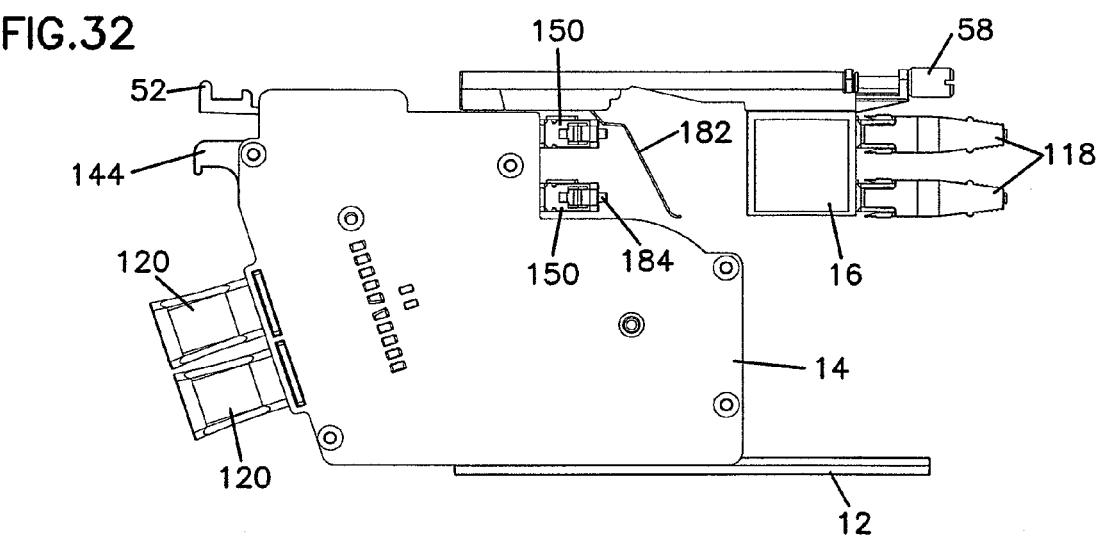
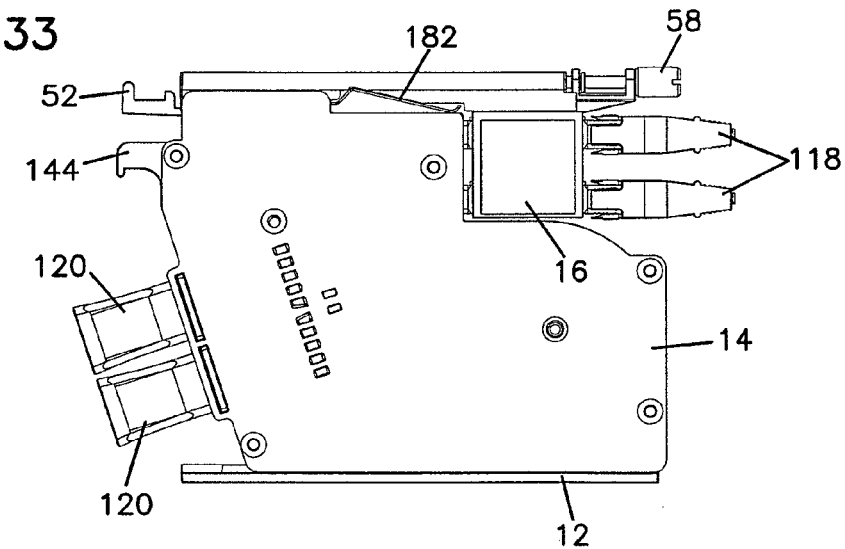

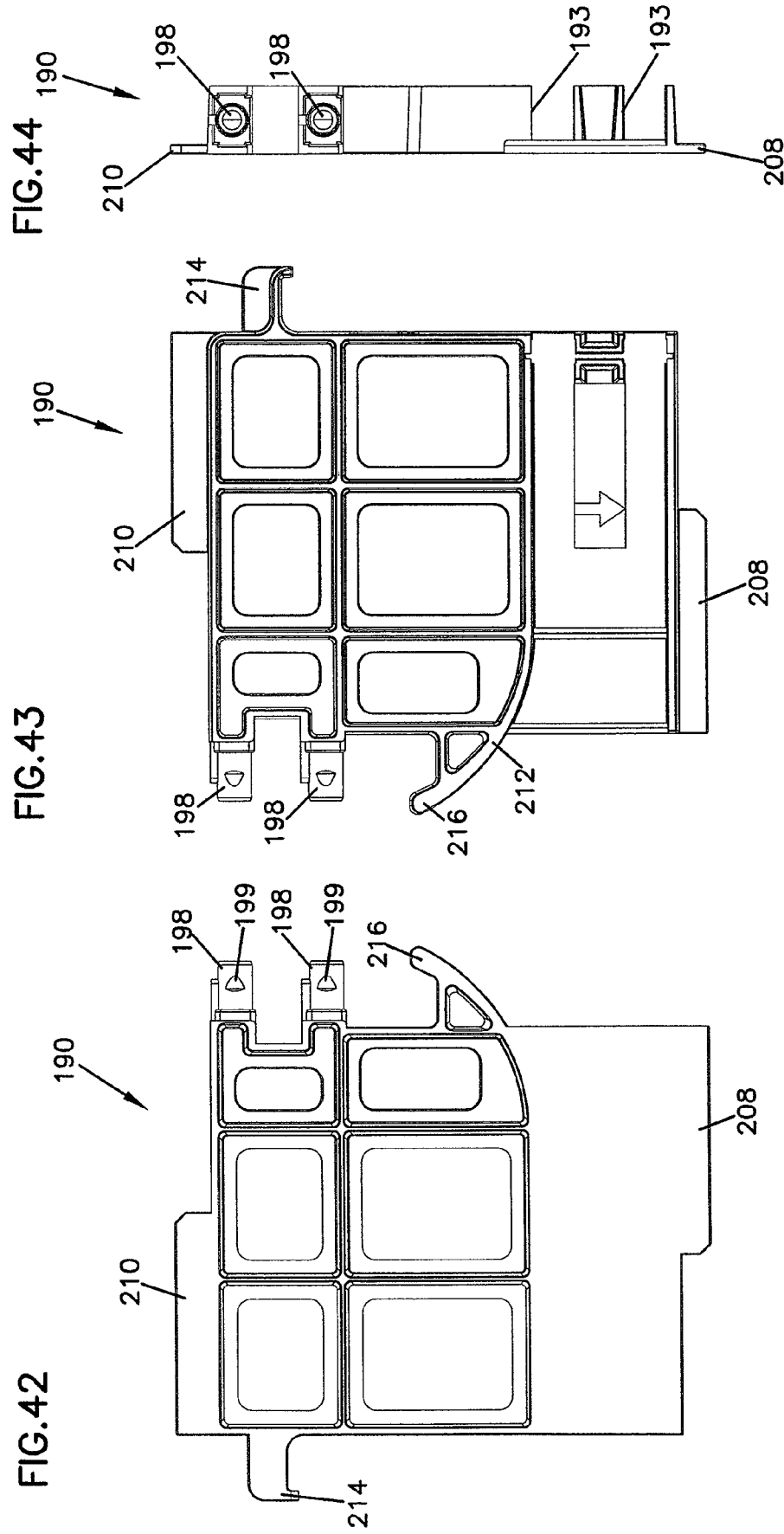

FIBER OPTIC SPLITTER MODULE

CROSS REFERENCE TO RELATED APPLICATIONS

This application is a continuation of application Ser. No. 12/229,511, now U.S. Pat. No. 7,606,459, filed Aug. 22, 2008, which is a continuation of application Ser. No. 11/354,297, filed Feb. 13, 2006, now U.S. Pat. No. 7,418,181, issued Aug. 26, 2008, which applications are incorporated herein by reference in their entirety.

FIELD

The present invention generally relates to fiber optic telecommunications equipment. More specifically, the present invention relates to fiber optic modules and chassis for holding fiber optic modules.

BACKGROUND

In fiber optic telecommunications systems, it is common for optical fibers of transmission cables to be split into multiple strands, either by optical splitting of a signal carried by a single stranded cable or by fanning out the individual fibers of a multi-strand cable. Further, when such systems are installed, it is known to provide excess capacity in the installations to support future growth and utilization of the fibers. Often in these installations, modules including splitters or fanouts are used to provide the connection between transmission fibers and customer fibers. To reduce the cost and complexity of the initial installation and still provide options for future expansion, a module mounting chassis capable of mounting multiple modules may be used in such an installation.

While the chassis may accept several modules, the initial installation may only include fewer modules mounted in the chassis, or enough to serve current needs. These chassis may be configured with limited access to one or more sides, or may be mounted in cramped locations. In addition, some of these chassis may be pre-configured with the maximum capacity of transmission cables to accommodate and link to modules which may be installed in the future. Since it is desirable to have access to components within the chassis for cleaning during the installation of a new module, some provision or feature of the chassis will desirably permit a user to access and clean the connectors of these pre-connectorized and pre-installed transmission cables.

It is also desirable for the chassis to be configured to ensure that modules are installed correctly and aligned with other components within the chassis to mate with the pre-connectorized and pre-installed transmission cables.

SUMMARY

The present invention relates to a telecommunications assembly including a chassis and a plurality of modules mounted within the chassis. The modules include one or more fiber optic connectors. Within an interior of the chassis at each mounting location are positioned corresponding fiber optic adapters. Inserting the module through a front opening of the chassis at a mounting location positions the one or more connectors of the module for insertion into and mating with the adapters of the chassis. The adapters within the interior of the chassis are integrally formed within a removable adapter assembly.

The present invention further relates to a method of mounting a telecommunications module within a chassis.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 5 is a left side view of the telecommunications assembly of FIG. 1;

FIG. 6 is a right side view of the telecommunications assembly of FIG. 1;

FIG. 10 is a right side view of the adapter assembly of FIG. 8;

FIG. 11 is a left side view of the adapter assembly of FIG. 8;

FIG. 12 is a front view of the adapter assembly of FIG. 8;

FIG. 13 is a rear view of the adapter assembly of FIG. 8;

FIG. 17 is a left side view of the fiber optic splitter module and adapter assembly of FIG. 16;

FIG. 18 is a front view of the fiber optic splitter module and adapter assembly of FIG. 16;

FIG. 29 is a right side view of the fiber optic splitter module of FIG. 20, shown without a cover exposing the interior features of the fiber optic splitter module including routing of a fiber optic cable within the fiber optic splitter module;

FIG. 30 is a cross-sectional view taken along section line 30-30 of FIG. 29;

FIG. 31 illustrates a fiber optic splitter module partially inserted within the chassis of FIG. 1, the chassis including an adapter assembly mounted thereon, the fiber optic splitter module shown in a position prior to the connectors of the splitter module having contacted a shield located within the chassis;

FIG. 32 illustrates the fiber optic splitter module of FIG. 31, shown in a position within the chassis with the connectors of the fiber optic splitter module making initial contact with the shield located within the chassis;

FIG. 33 illustrates the fiber optic splitter module of FIG. 31, shown in a fully inserted position within the chassis;

FIG. 42 is a right side view of the dust cap/test tool of FIG. 40;

FIG. 43 is a left side view of the dust cap/test tool of FIG. 40;

FIG. 44 is a rear view of the dust cap/test tool of FIG. 40;

DETAILED DESCRIPTION

Figure 1:
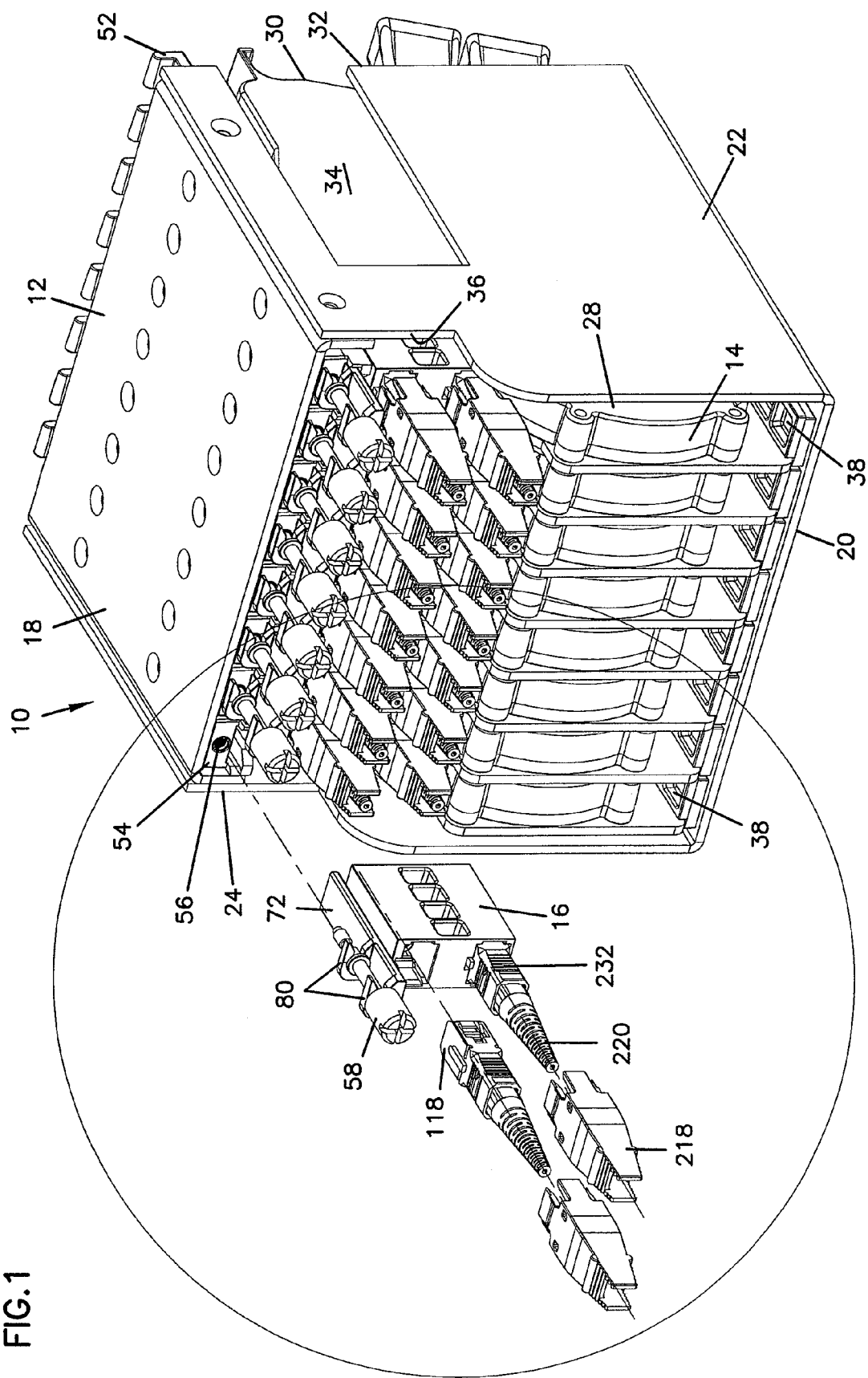
FIG. 1 is a rear perspective view of a telecommunications assembly with a plurality of fiber optic splitter modules installed within a chassis, with one of the adapter assemblies exploded out of the telecommunications assembly.
Figure 2:
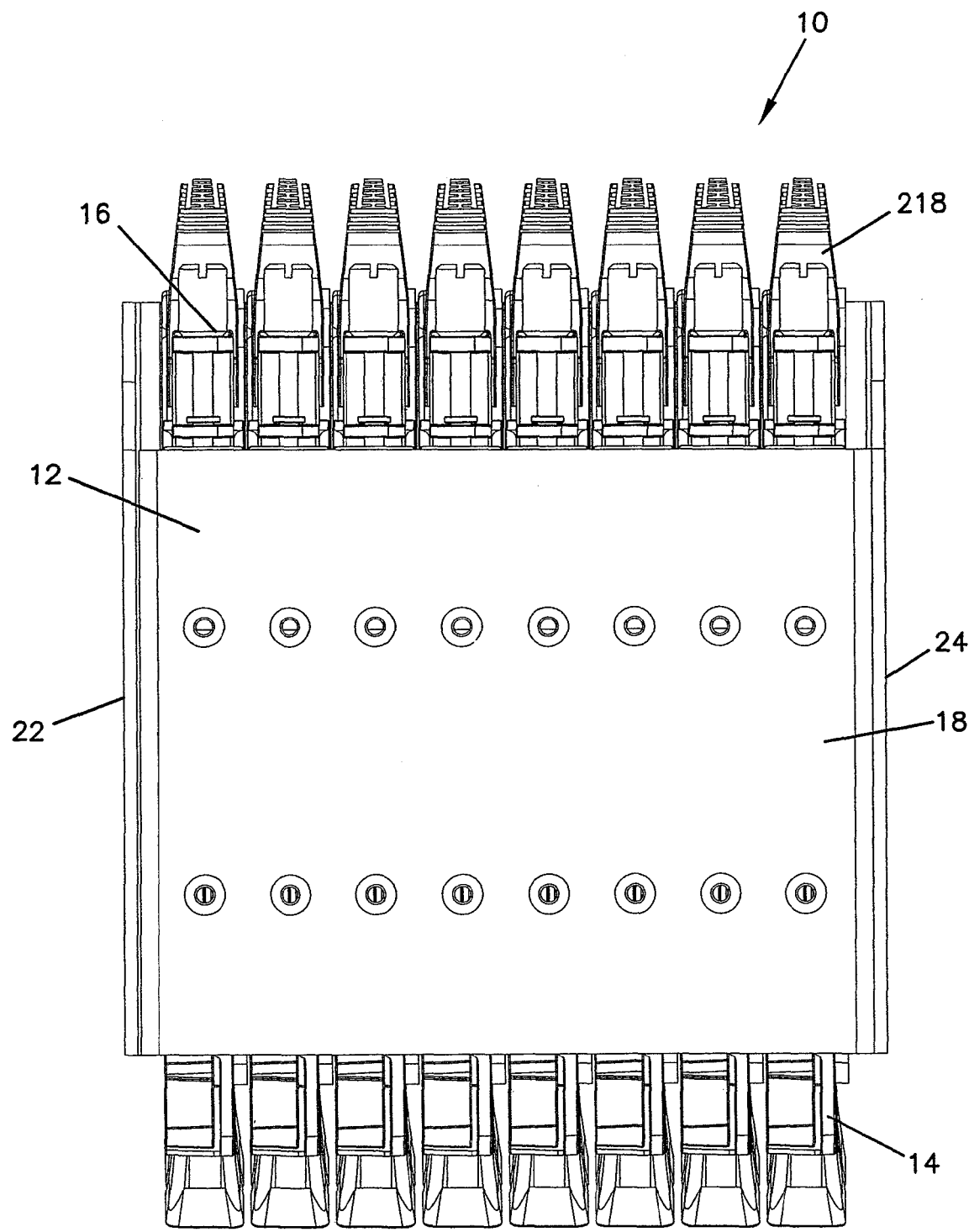
FIG. 2 is a top view of the telecommunications assembly of FIG. 1.
Figure 4:
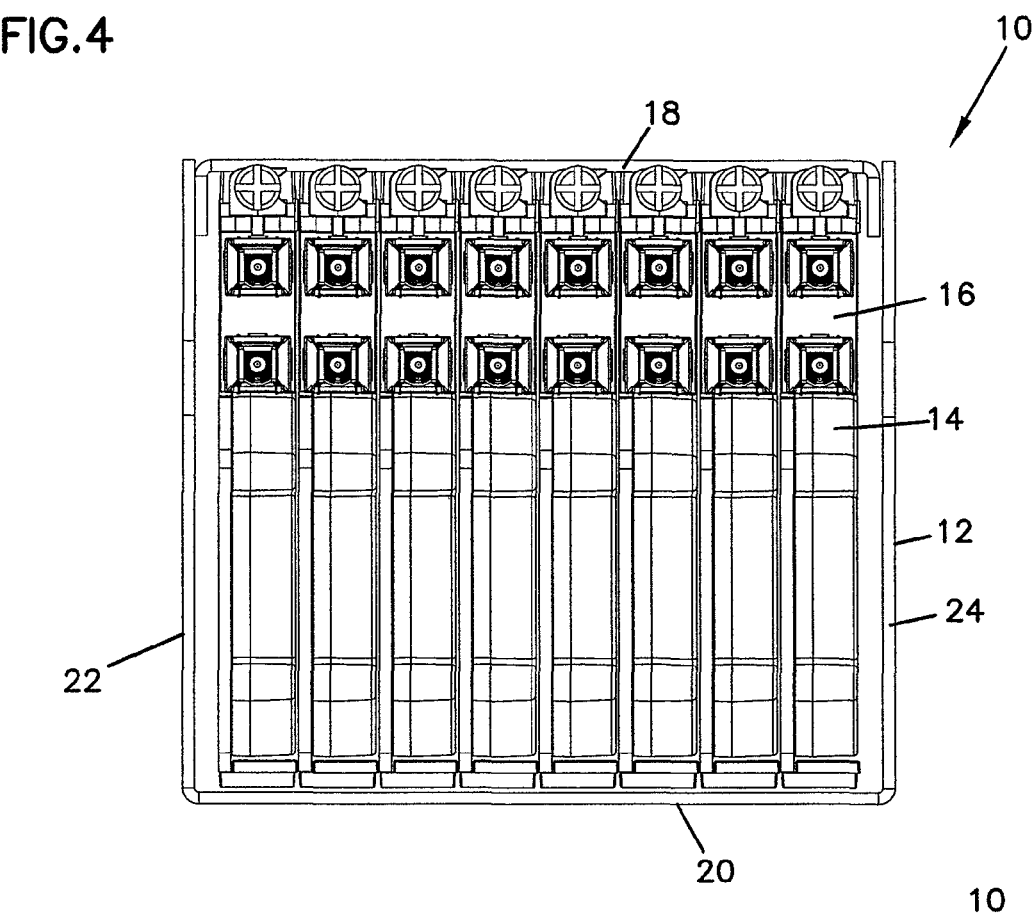
FIG. 4 is a rear view of the telecommunications assembly of FIG. 1.
Figure 3:
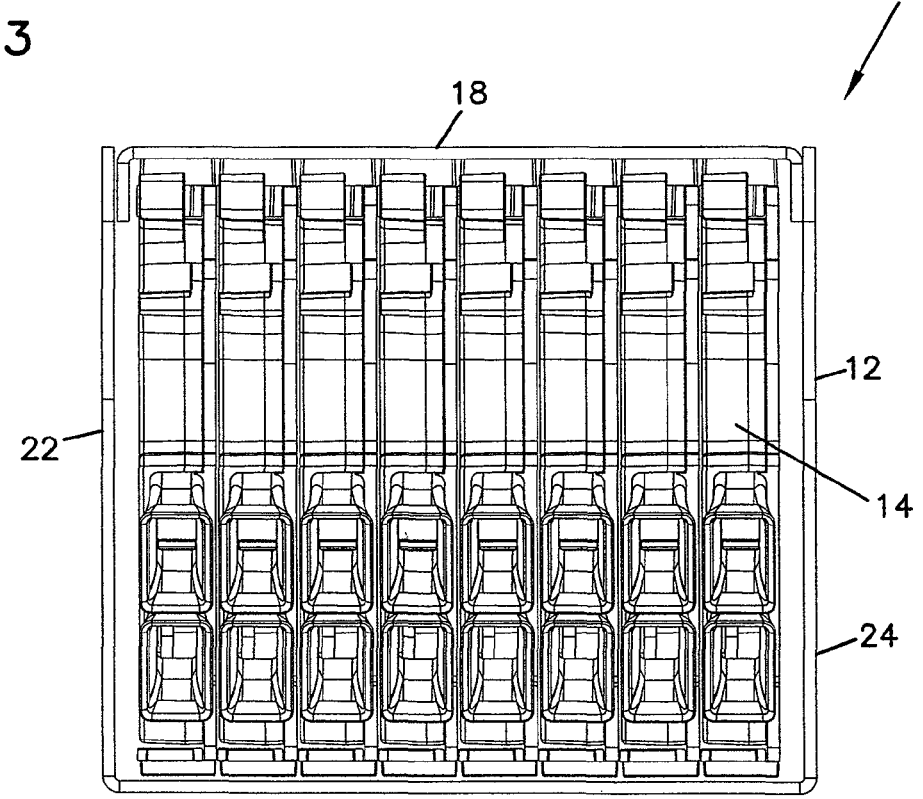
FIG. 3 is a front view of the telecommunications assembly of FIG. 1.

Reference will now be made in detail to exemplary aspects of the present invention which are illustrated in the accompanying drawings. Wherever possible, the same reference numbers will be used throughout the drawings to refer to the same or similar parts.

FIGS. 1-7 illustrate a telecommunications assembly 10 that includes a telecommunications chassis 12 and a plurality of fiber optic splitter modules 14 adapted to be mounted within chassis 12. Fiber optic splitter modules 14 are configured to be slidably inserted within chassis 12 and be optically coupled to adapter assemblies 16 mounted within chassis 12. Adapter assemblies 16 mounted within chassis 12 form connection locations between connectors terminated to an incoming fiber optic cable and connectors of splitter modules 14 as will be discussed in further detail below.

Still referring to FIGS. 1-7, chassis 12 includes a top wall 18 and a bottom wall 20 extending between a pair of opposing transverse sidewalls, 22, 24. Chassis 12 includes an opening 26 through a rear side 28 of chassis 12 and an opening 30 through a front side 32 of chassis 12. Fiber optic splitter modules 14 are inserted into chassis 12 through front opening 30. Adapter assemblies 16 are inserted through and mounted adjacent rear opening 26 of chassis 12. Sidewalls 22, 24, each include a cut-out 34 extending from front opening 30 toward rear side 28. Splitter modules 14 mounted within chassis 12 are visible through cut-out 34. Sidewalls 22, 24 of chassis 12 also define an inset portion 36 at rear side 28 of chassis 12 to facilitate access to adapter assemblies 16.

In FIG. 1, chassis 12 is shown with eight fiber optic splitter modules 14 mounted thereon. It should be noted that in other embodiments, the chassis may be sized to hold a larger or a smaller number of splitter modules.

Figure 36:
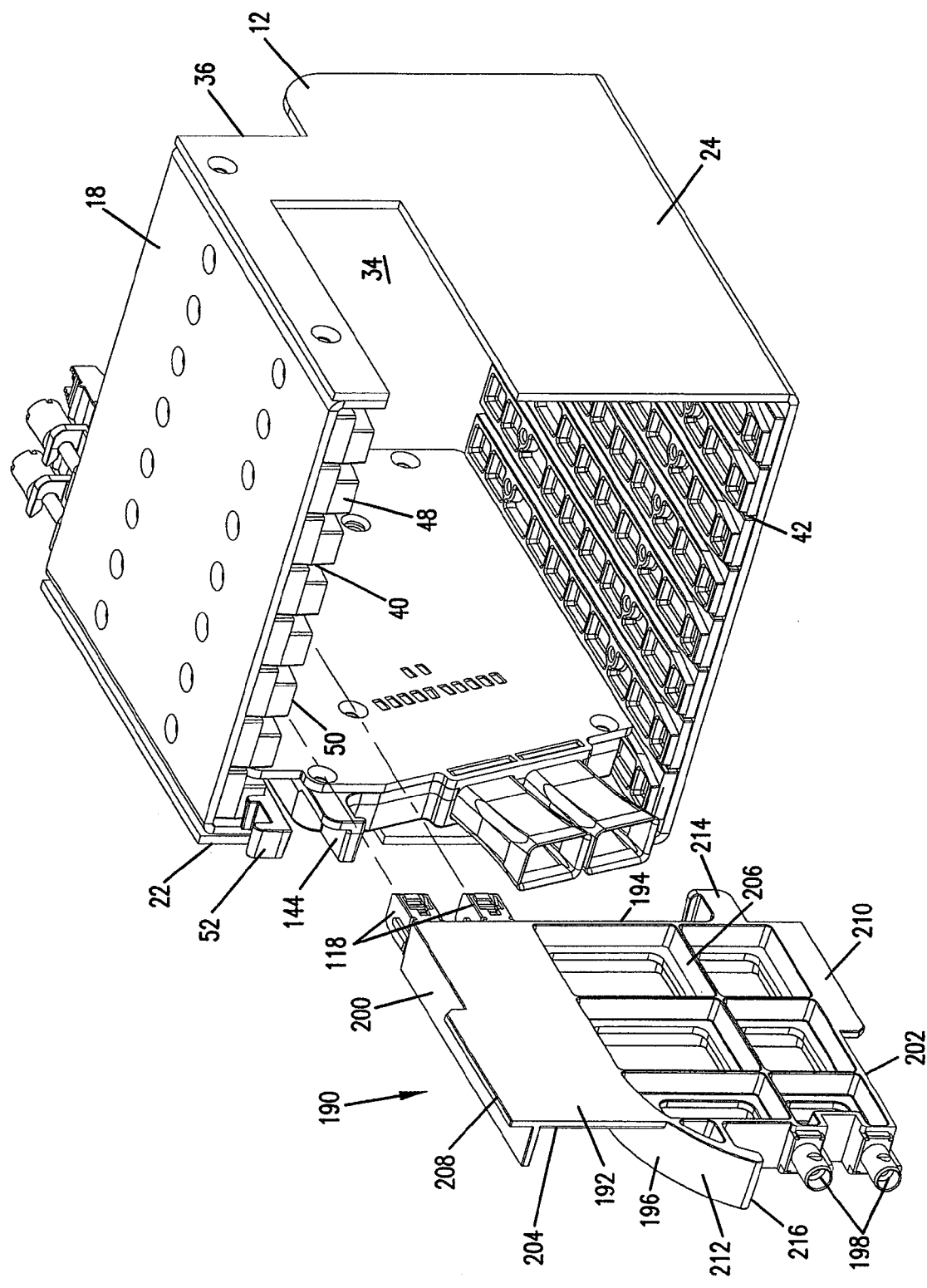
FIG. 36 illustrates a front perspective view of the chassis of FIG. 1 with a fiber optic splitter module mounted thereon, shown in combination with a dust cap/test tool exploded off the chassis, the dust cap/test tool being used as a test tool.
Figure 37:
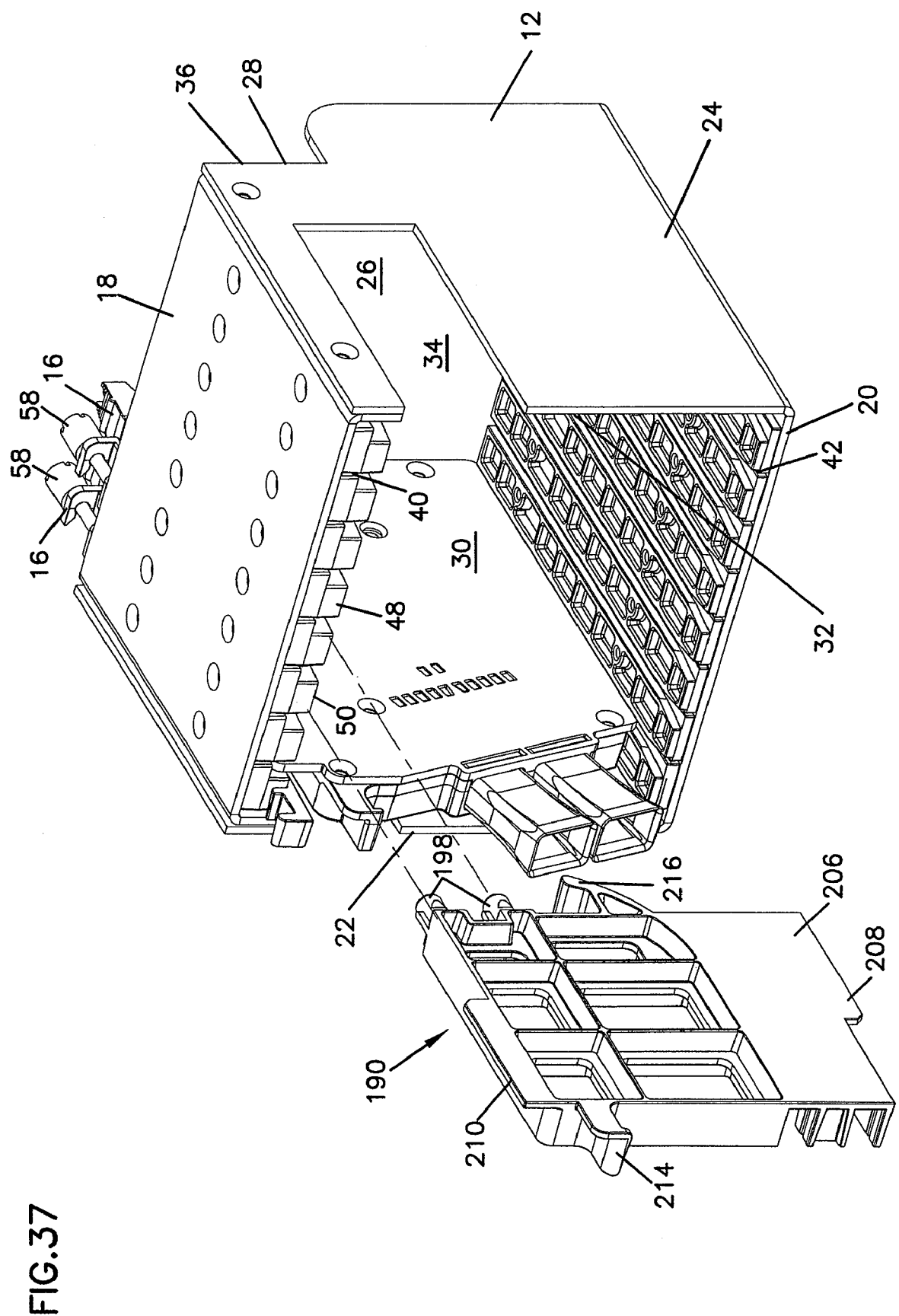
FIG. 37 illustrates a front perspective view of the chassis of FIG. 36, shown in combination with the dust cap/test tool exploded off the chassis, the dust cap/test tool being used as a dust cap.

Still referring to FIGS. 1-7, chassis 12 includes a plurality of mounting locations 38 for slidably receiving splitter modules 14. Each mounting location 38 defines a slot 40 adjacent top wall 18 and a slot 42 adjacent bottom wall 20 of chassis 12. Slots 42 adjacent bottom wall 20 are visible in FIG. 1. Slots 40 adjacent top wall 18 are illustrated in FIGS. 36 and 37. Slots 40, 42 extend from front 32 of chassis 12 to rear 28 of chassis 12. Slots 40, 42 are configured to receive mounting flanges 44, 46 of splitter modules 14 as shown in FIGS. 36 and 37 to align modules 14 with other components within chassis 12 (e.g., adapters of the adapter assemblies) to mate with pre-connectorized and/or pre-installed transmission cables.

Slots 40 defined underneath top wall 18 of chassis 12 are deeper than slots 42 defined at bottom wall 20 of chassis 12. The depth of slots 40, 42 are configured to accommodate the different sized flanges 44, 46 that are defined at top and bottom walls of splitter modules 14. In this manner, slots 40, 42 and mounting flanges 44, 46 of fiber optic splitter modules 14 provide a keying system to ensure that modules 14 are inserted into chassis 12 in the correct orientation.

Slots 40 underneath top wall 18 of chassis 12 are defined between a plurality of bulkheads 48 (please see FIGS. 36 and 37). Bulkheads 48 extend from front 32 of chassis 12 to rear 28 of chassis 12. At front end 32 of chassis 12, each bulkhead 48 defines a downwardly extending front lip 50 (FIG. 35) which interlocks with a resiliently deformable latch 52 (e.g., cantilever arm) of splitter module 14 to hold splitter module 14 in place within chassis 12, as will be discussed in further detail below.

Figure 7:
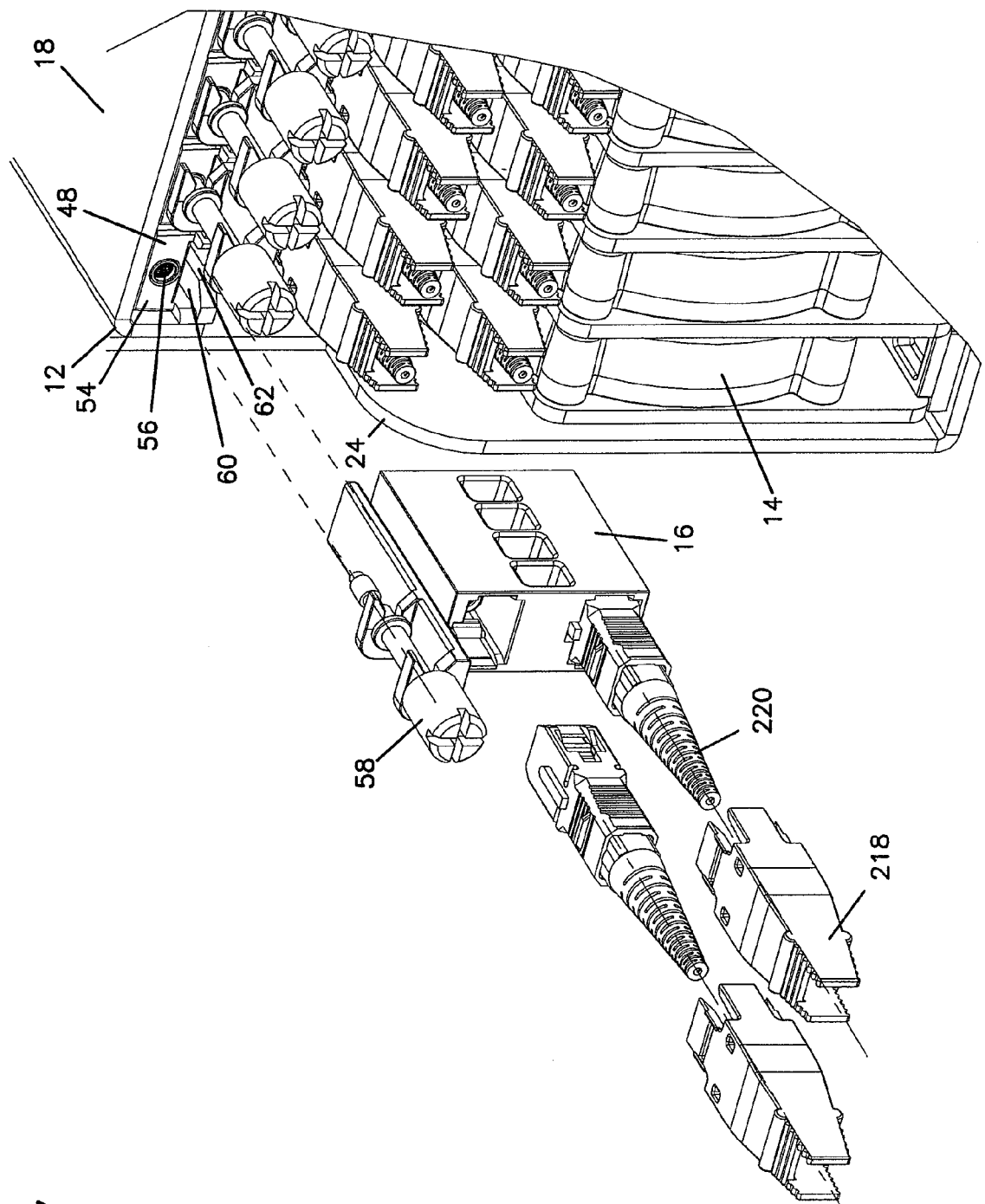
FIG. 7 is a close-up view of the telecommunications assembly of FIG. 1 showing the adapter assembly exploded out of the telecommunications assembly.
Figure 8:
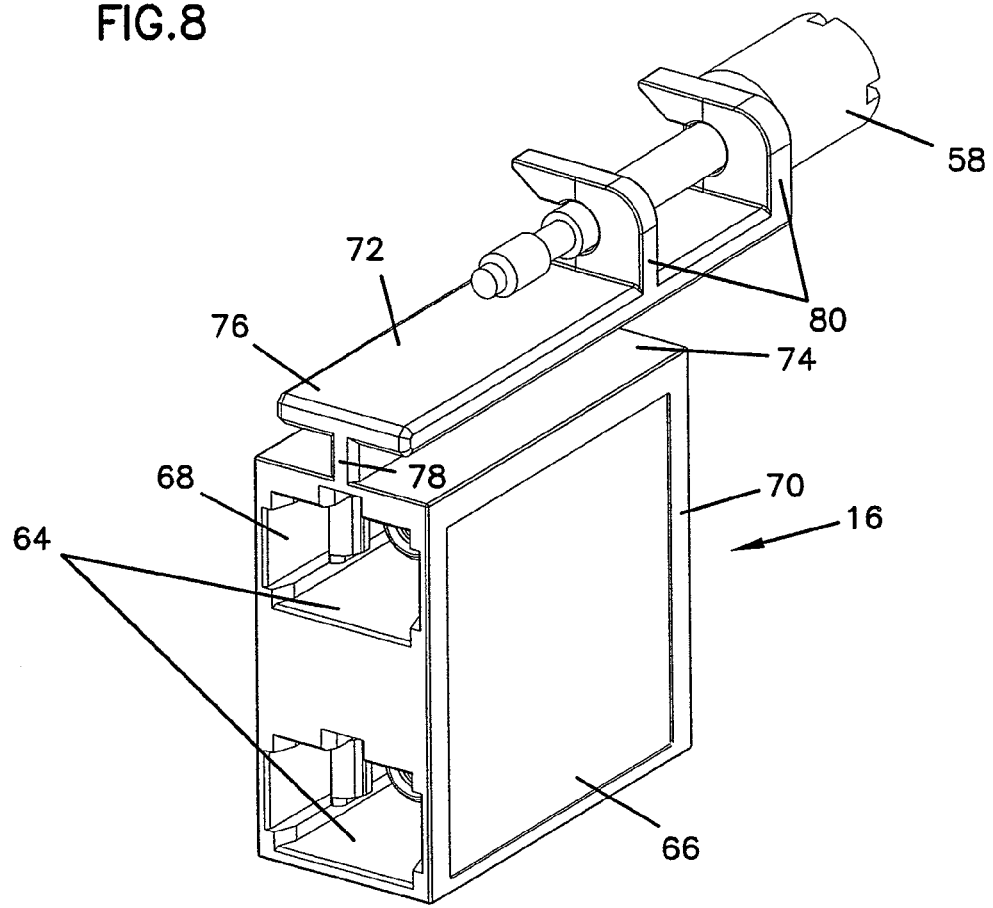
FIG. 8 is a front perspective view of one of the adapter assemblies of FIG. 1.
Figure 9:
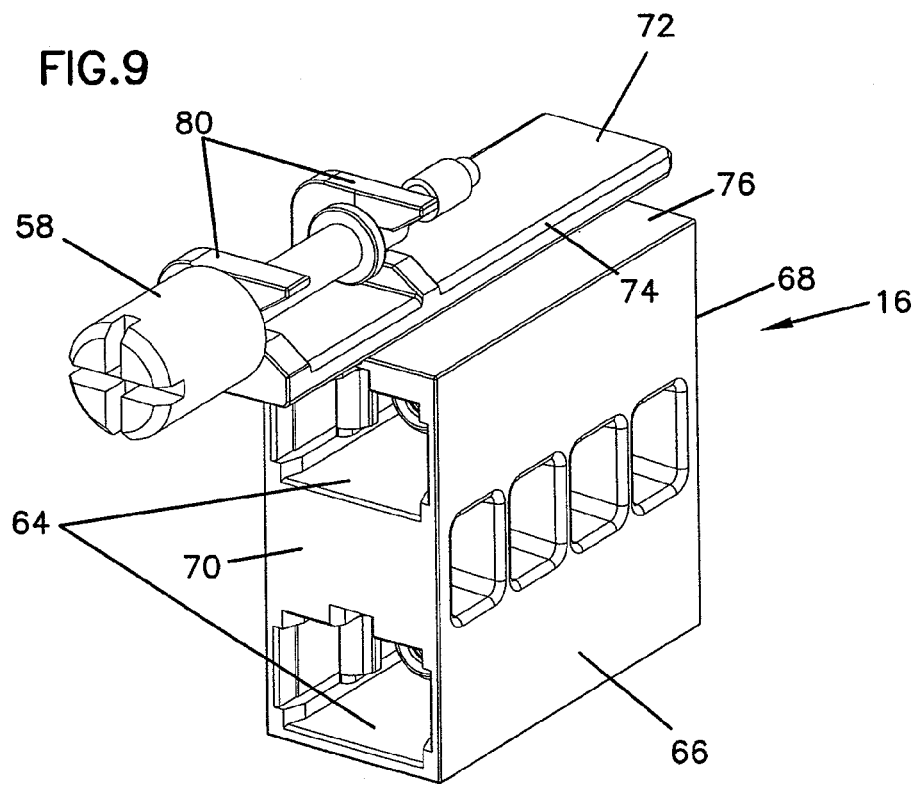
FIG. 9 is a rear perspective view of the adapter assembly of FIG. 8.
Figure 14:
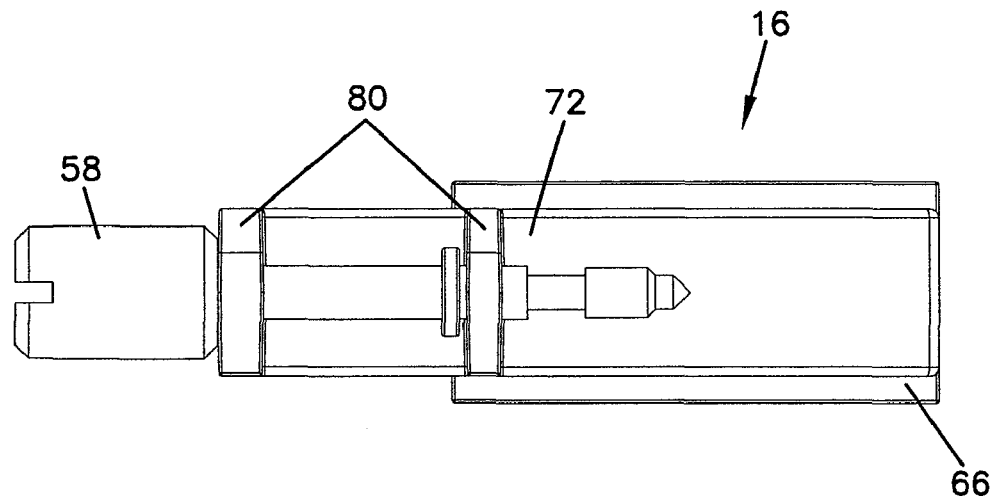
FIG. 14 is a top view of the adapter assembly of FIG. 8.
Figure 15:
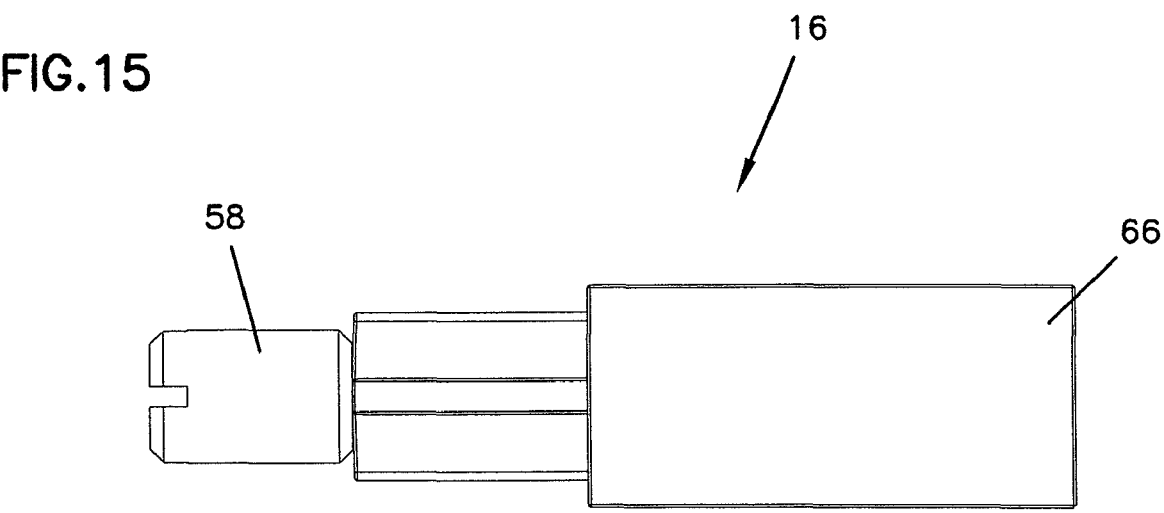
FIG. 15 is a bottom view of the adapter assembly of FIG. 8.
Figure 19:
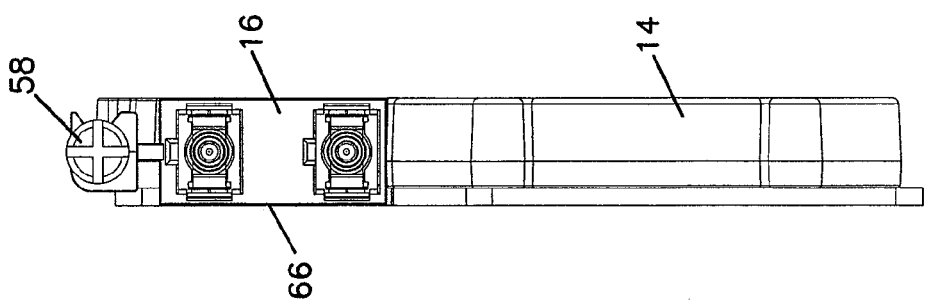
FIG. 19 is a rear view of the fiber optic splitter module and adapter assembly of FIG. 16.
Figure 16:
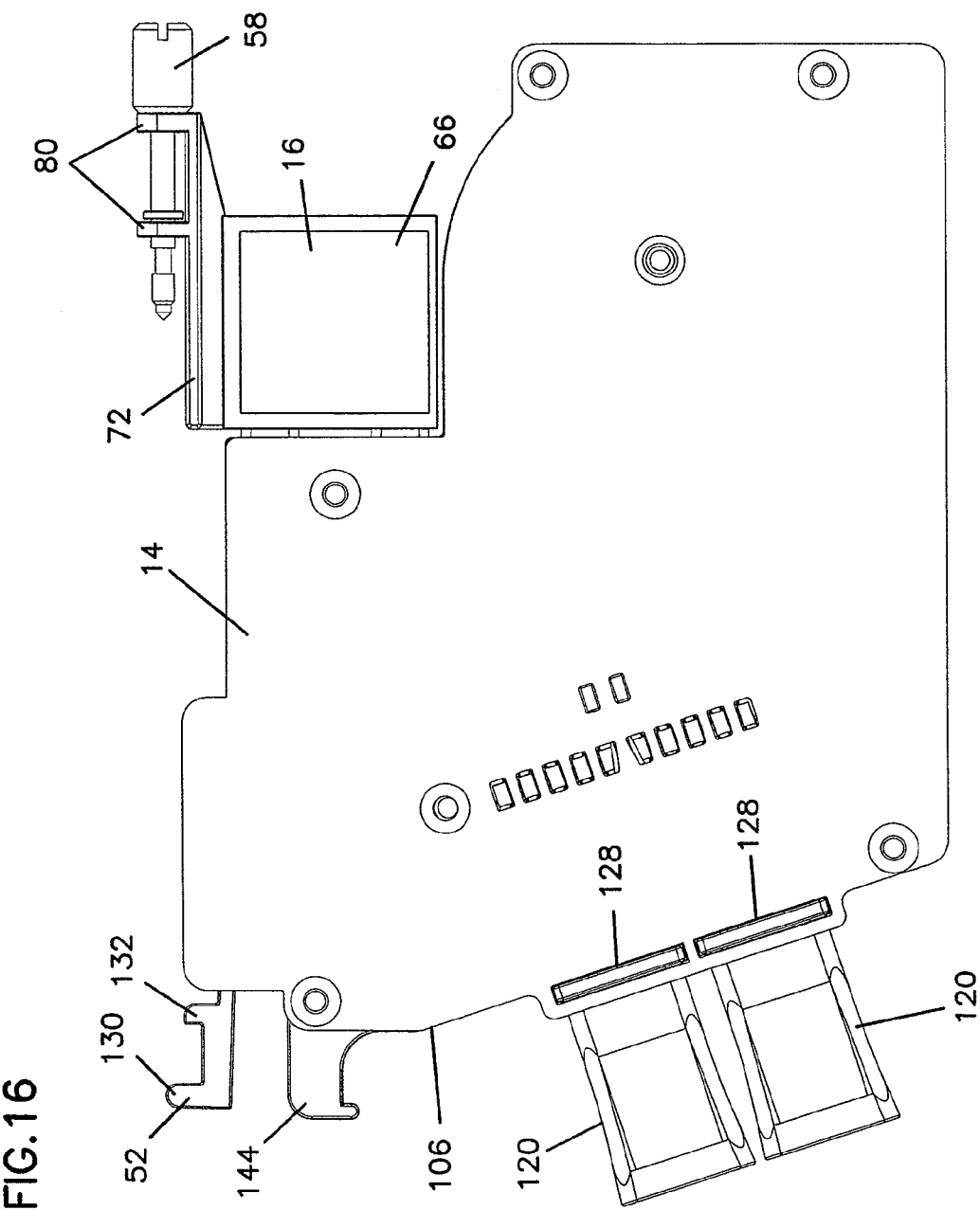
FIG. 16 is a right side view of one of the fiber optic splitter modules of FIG. 1, shown with an adapter assembly mounted thereon.
Figure 20:
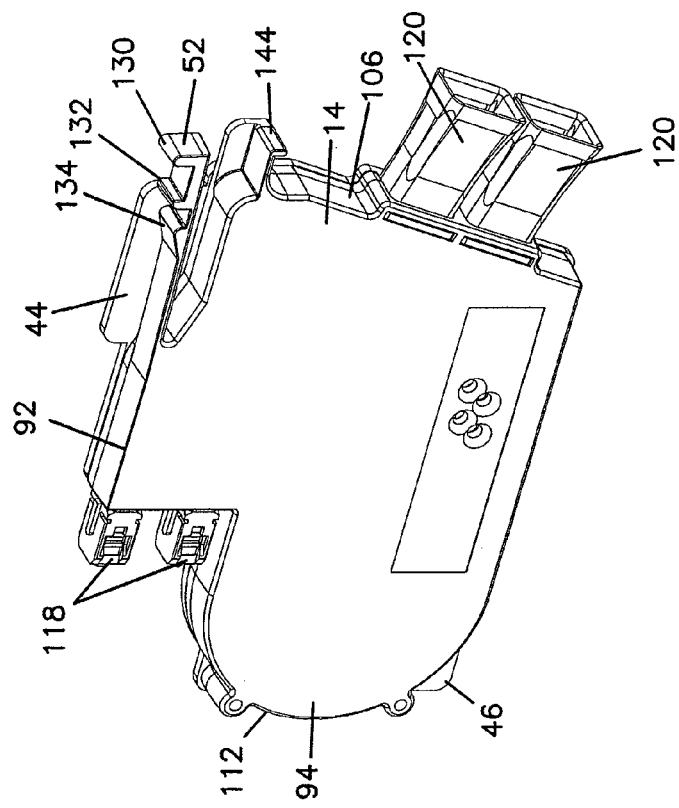
FIG. 20 is a front perspective view of the fiber optic splitter module of FIG. 16, shown in isolation without an adapter assembly mounted thereon.
Figure 21:
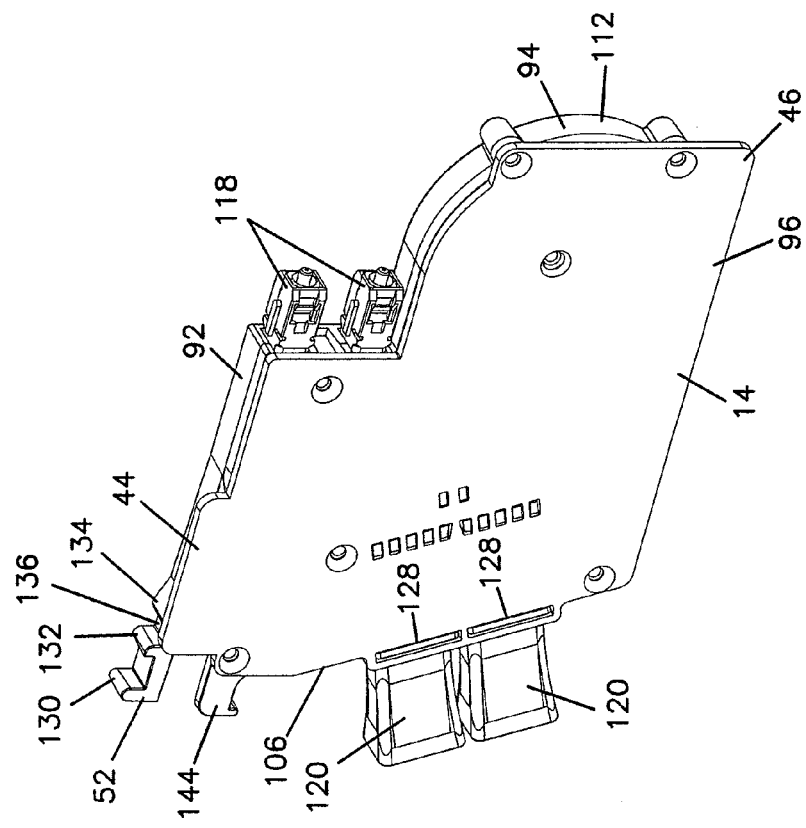
FIG. 21 is a rear perspective view of the fiber optic splitter module of FIG. 20.

Referring to FIGS. 1 and 7, at rear end 28 of chassis 12, each bulkhead 48 defines a rear face 54 with a fastener hole 56 for receiving a fastener 58 (e.g., a thumbscrew) of an adapter assembly 16 for mounting adapter assembly 16 to chassis 12. In the embodiment shown, fastener hole 56 is threaded to receive a screw-type fastener. It should be noted that in other embodiments, other types of fastening structures may be used to mount adapter assembly 16 to rear 28 of chassis 12.

Adjacent rear end 28, each bulkhead 48 also includes a horizontal slot 60 and a vertical slot 62 that complement the shape of adapter assembly 16 to slidably receive adapter assembly 16.

FIGS. 8-15 illustrate adapter assembly 16 according to the invention. Adapter assemblies 16 form connection locations between the connectors terminated to an incoming fiber optic cable and the connectors of splitter modules 14 mounted within chassis 12.

Referring to FIGS. 8-15, adapter assembly 16 includes two integrated adapters 64 formed as a part of a unitary housing 66. In other embodiments, other number of adapters are also possible. Each adapter 64 of adapter assembly 16 includes a front end 68 and a rear end 70. Front end 68 of each adapter 64 receives a connector of fiber optic splitter module 14 and rear end 70 receives a connector terminated to an incoming fiber optic cable.

Adapter assembly housing 66 includes a chassis-mounting slide 72 extending from a top 74 of housing 66, which is received within chassis 12 through rear end 28. Slide 72 defines a horizontal portion 76 and a vertical portion 78. Horizontal portion 76 is configured to be slidably received within horizontal slot 60 of bulkhead 48 and vertical portion 78 is configured to be slidably received within vertical slot 62 of bulkhead 48.

Chassis-mounting slide 72 includes a pair of flanges 80 for supporting a fastener 58 for securing adapter assembly 16 to chassis 12. As discussed earlier, fastener 58 is positioned within an opening 56 defined by rear face 54 of bulkheads 48 located underneath top wall 18 of chassis 12. Fastener 58 is preferably a captive fastener. In the embodiment of the adapter assembly shown in the FIGS., fastener 58 is a thumbscrew. In other embodiments, other types of fasteners may be used.

Figure 35:
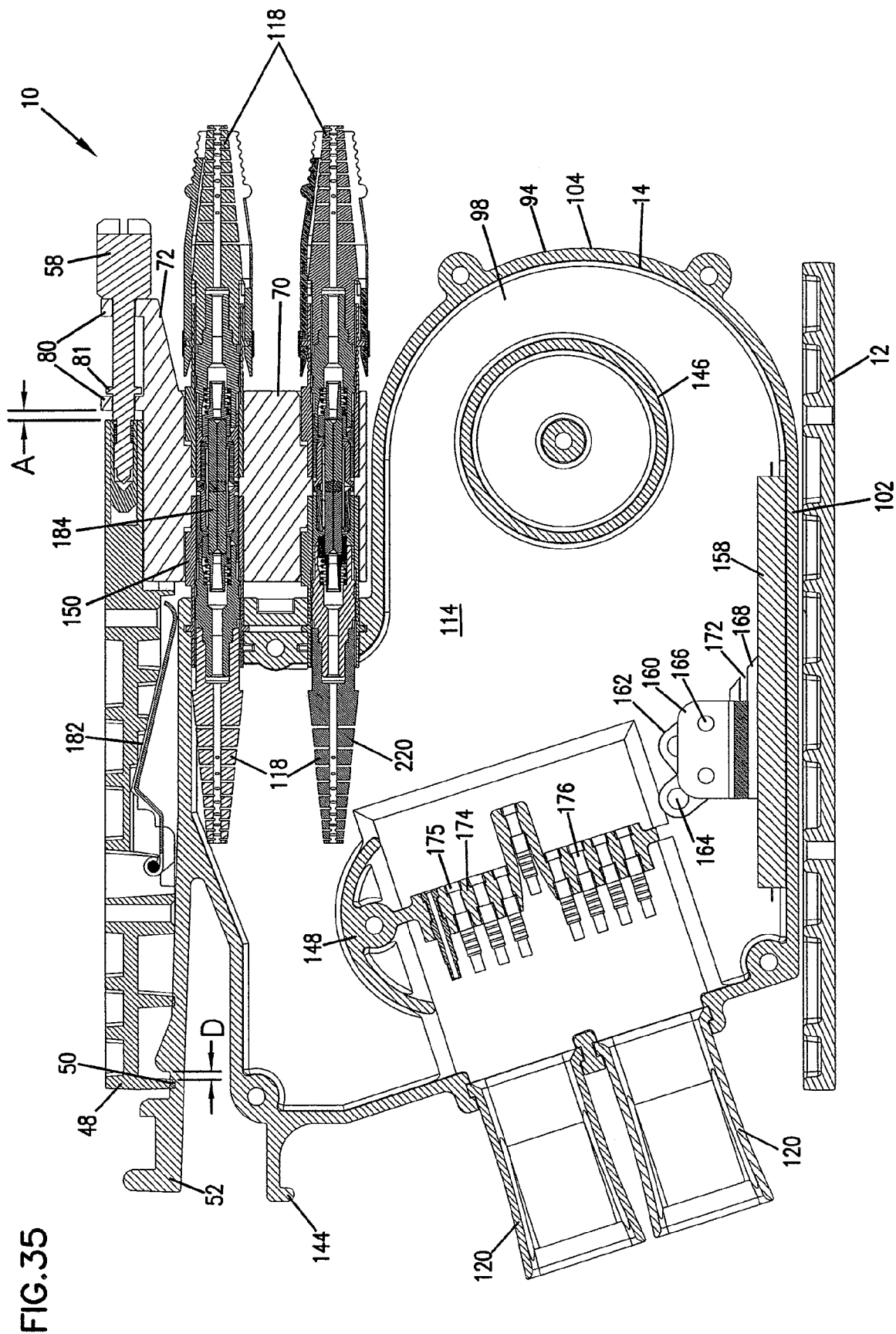
FIG. 35 is a side cross-sectional view of the fiber optic splitter module of FIG. 33 within the chassis, taken through the center of the fiber optic splitter module.

Fastener 58 is rotated to threadingly couple the adapter assembly 16 to the bulkheads 48. Fastener 58 is also configured such that it is able to provide adapter assembly 16 with a predetermined amount of horizontal float relative to the chassis 12 once mounted thereon. As illustrated in FIGS. 8-14, the fastener 58 of the adapter assembly 16 includes a flange 81. The fastener 58 is able to move horizontally within the flanges 80 relative to the adapter assembly housing 66. As shown in FIG. 35, once mounted to the chassis 12, the adapter assembly housing 66 is able to float or move horizontally with respect to the fastener 58 between flange 81 and the rear face of the bulkhead 48. For example, in FIG. 35, adapter assembly 16 is shown to be able to move or float a distance of A toward the rear end of chassis 12. In this manner, when a splitter module 14 is slidably pulled out of chassis 12 during disengagement, adapter assembly 16 is able to horizontally float a distance A towards splitter module 14 as the engaged connector 118 of splitter module 14 pulls on adapter 64 of adapter assembly 16. In this manner, adapter assembly 16 is provided with a certain amount of horizontal float when being engaged to and disengaged from splitter module 14.

Figure 38:
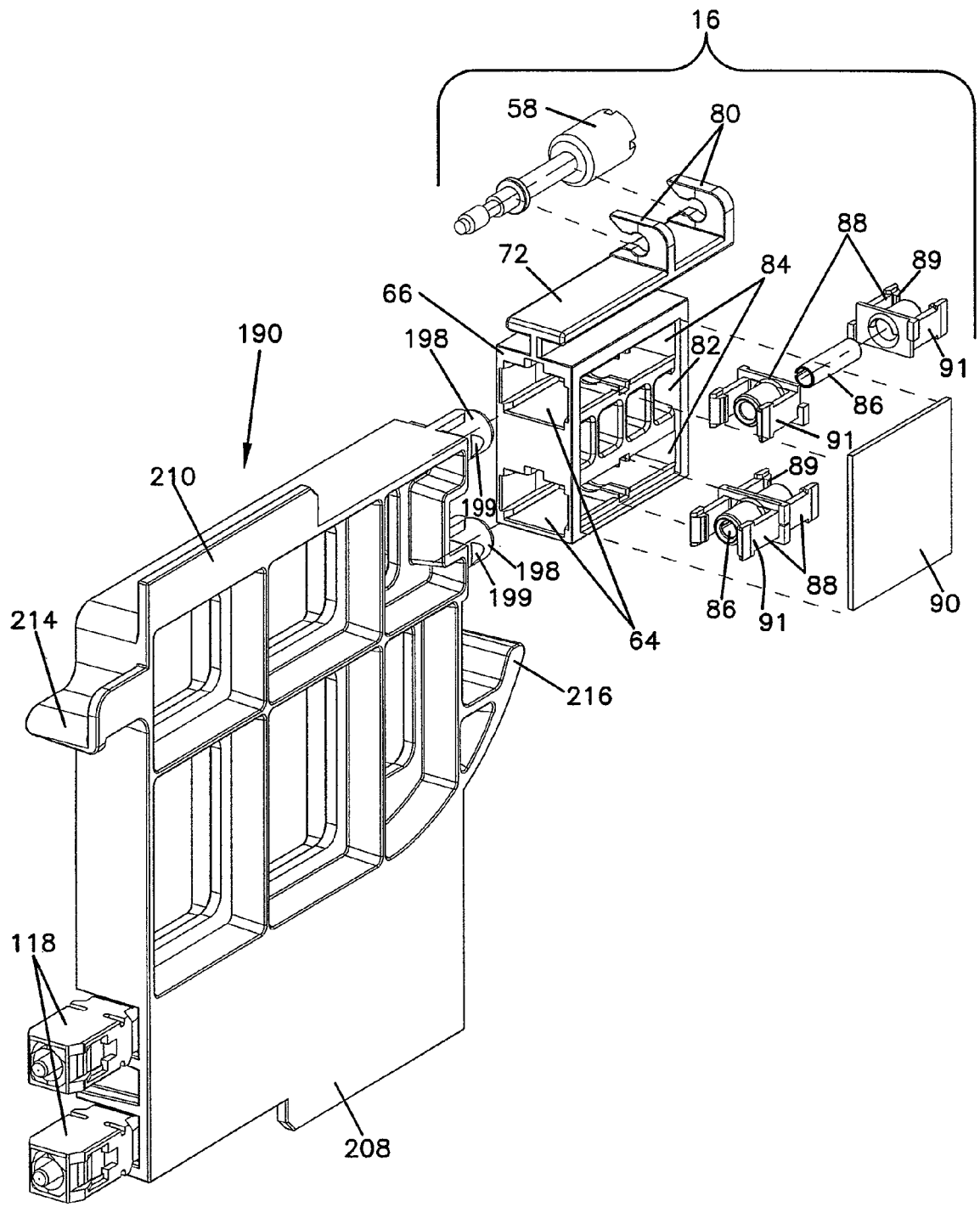
FIG. 38 illustrates the dust cap/test tool of FIG. 36 shown in combination with an exploded view of the adapter assembly of FIG. 8.

As shown in an exploded view of adapter assembly 16 in FIG. 38, elements of each adapter 64 are positioned through a side opening 82 into adapter recesses 84 formed within the adapter assembly housing 66. The elements for each adapter 64 include a ferrule alignment sleeve 86 and a pair of inner housing halves 88. These elements are placed within recesses 84 in manner similar to that shown in commonly-owned U.S. Pat. No. 5,317,663, issued May 20, 1993, entitled ONE-PIECE SC ADAPTER, the disclosure of which is incorporated herein by reference. A panel 90 closes opening 82 and secures the elements within each adapter 64. Adapters 64 shown are for SC style connectors, although other types, styles and formats of adapters may be used within the scope of the present disclosure and connectors to mate with these alternative adapters.

In FIGS. 16-19, adapter assembly 16 is shown mounted to a fiber optic splitter module 14, outside of chassis 12.

FIGS. 20-30 illustrate one of the fiber optic splitter modules 14 according to the invention. Referring to FIGS. 20-30, the fiber optic splitter module 14 includes a splitter module housing 92. Splitter module housing 92 includes a main housing portion 94 and a removable cover 96. Main housing portion 94 includes a first transverse sidewall 98 extending between a top wall 100, a bottom wall 102, a rear wall 104, and a front wall 106. Removable cover 96 defines a second transverse wall 108 of splitter module housing 92 and closes off the open side of module main housing 94.

Figure 23:
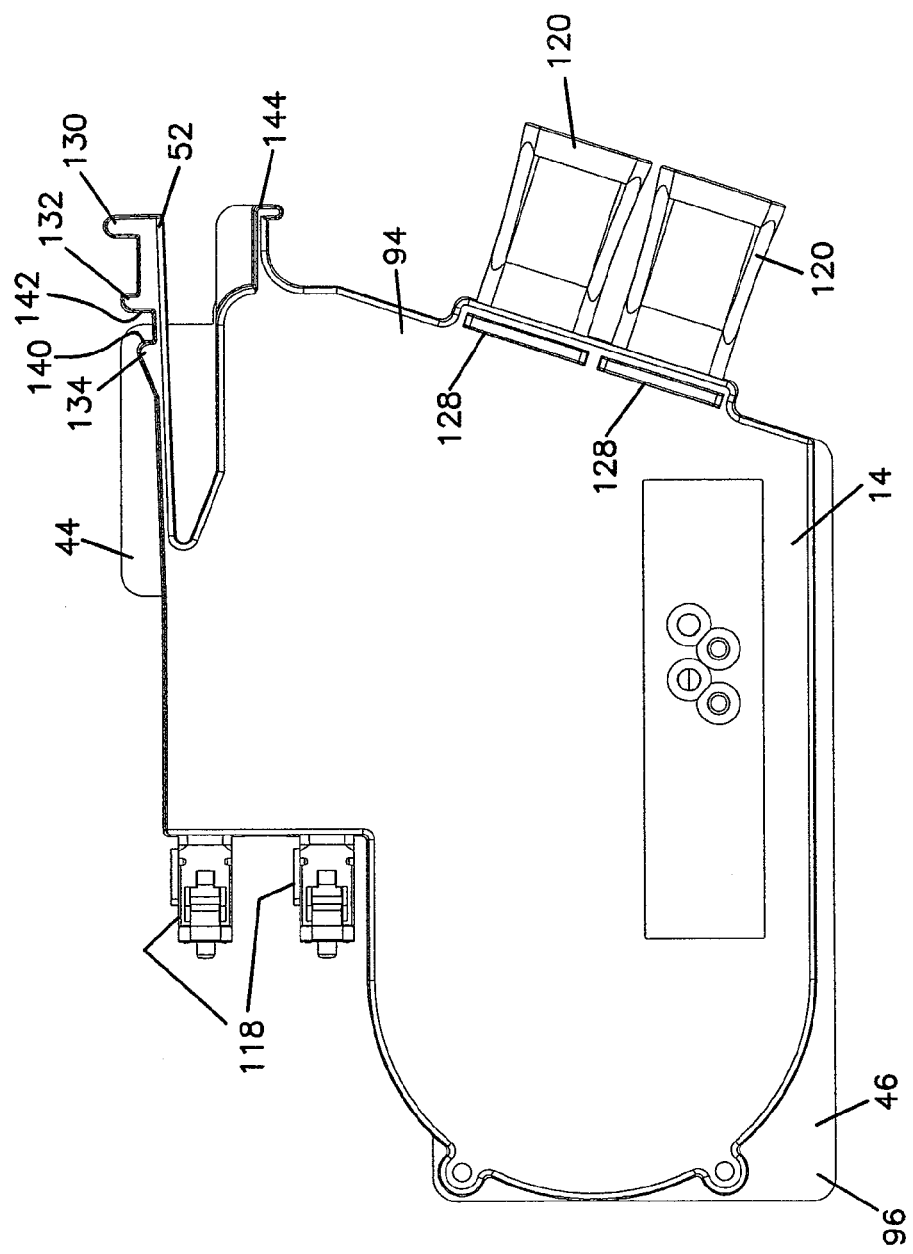
FIG. 23 is a left side view of the fiber optic splitter module of FIG. 20.
Figure 26:
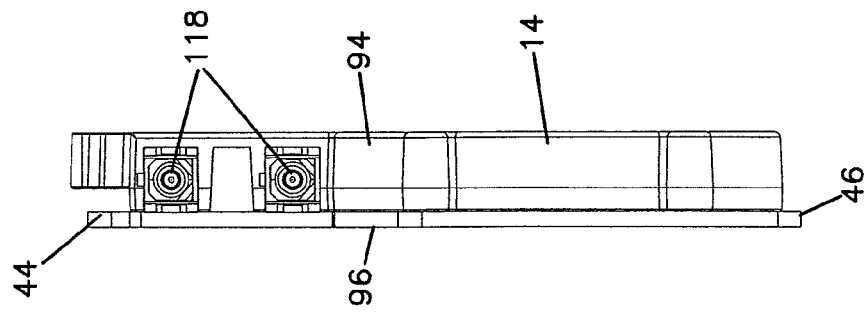
FIG. 26 is a rear view of the fiber optic splitter module of FIG. 20.
Figure 24:
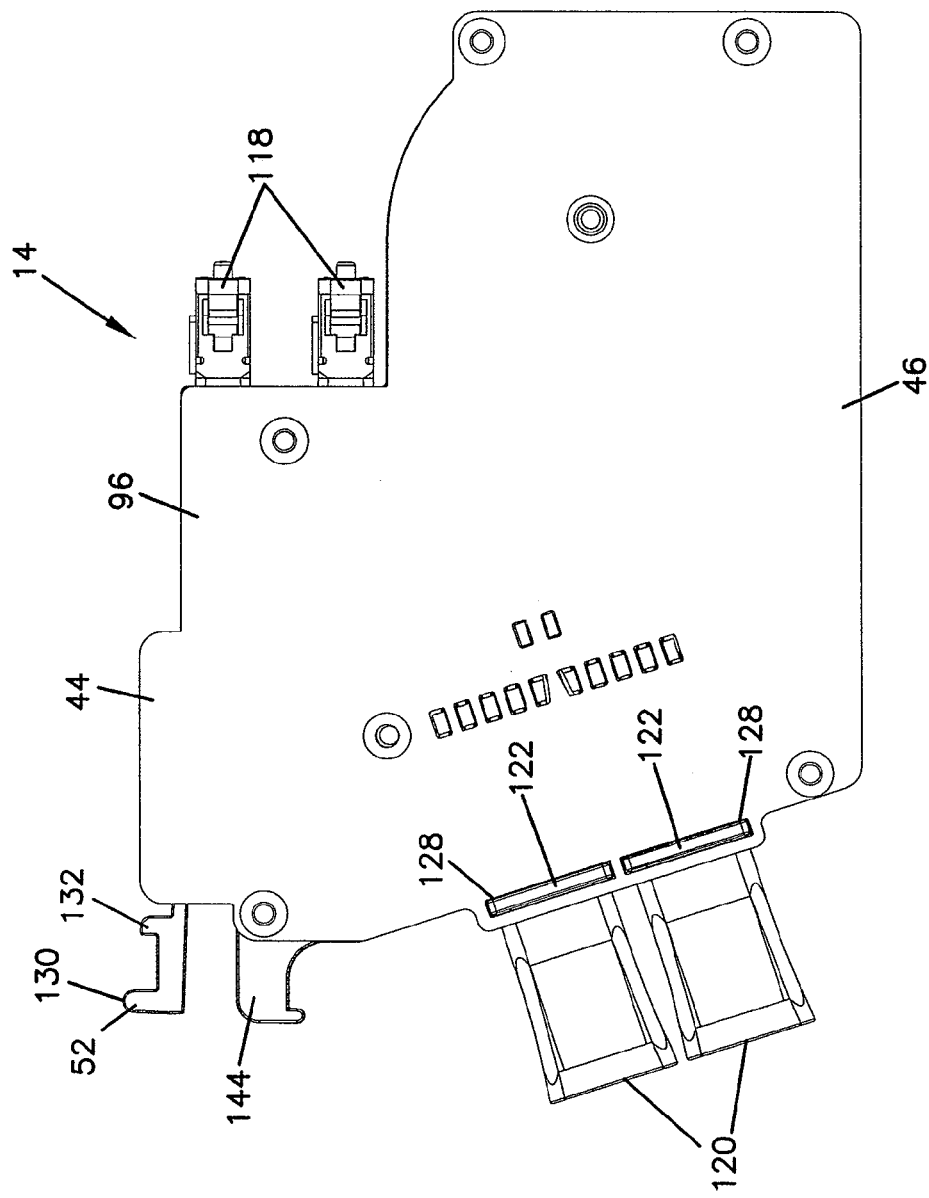
FIG. 24 is a right side view of the fiber optic splitter module of FIG. 20.
Figure 25:
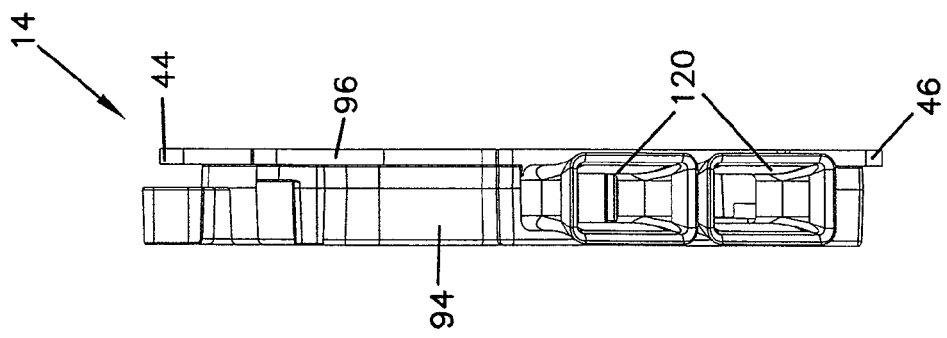
FIG. 25 is a front view of the fiber optic splitter module of FIG. 20.
Figure 27:
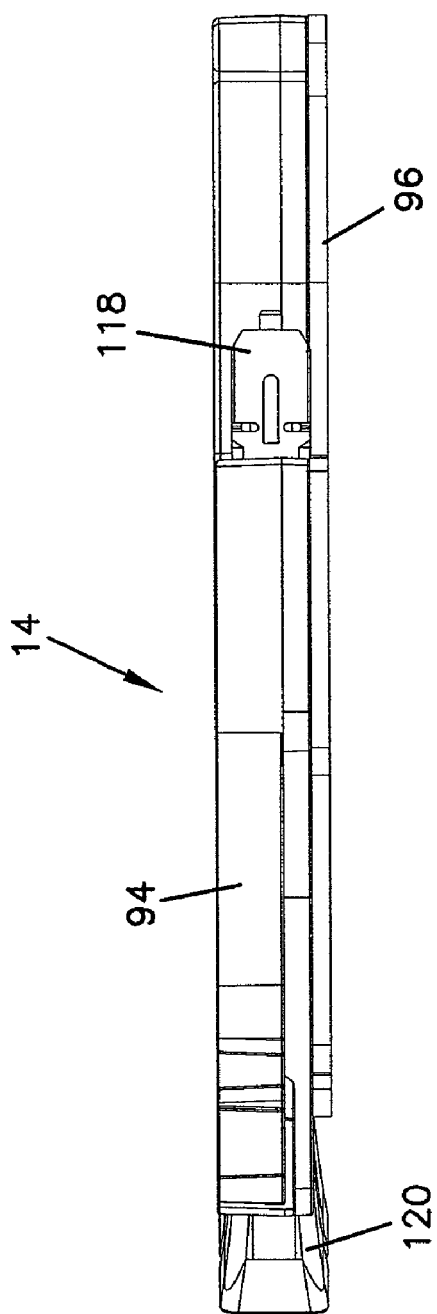
FIG. 27 is a top view of the fiber optic splitter module of FIG. 20.
Figure 28:
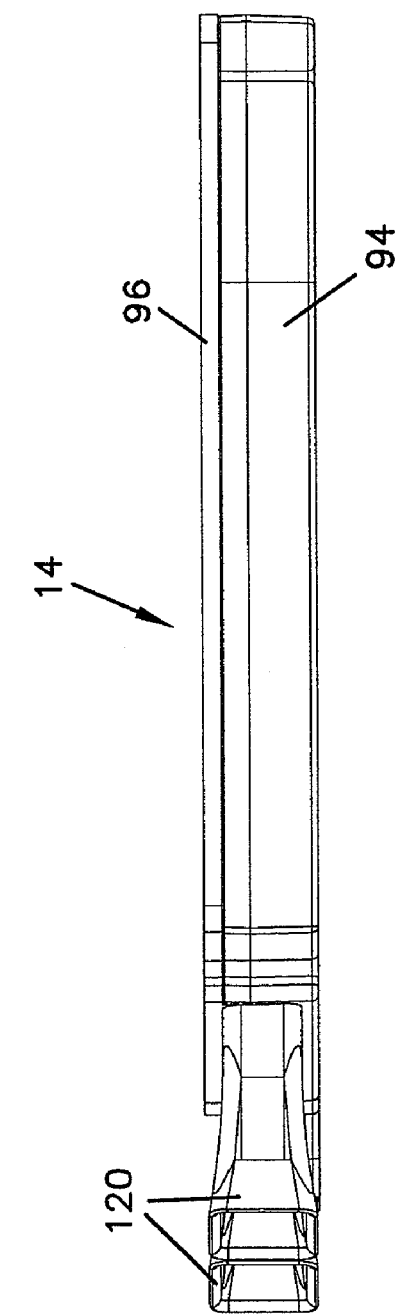
FIG. 28 is a bottom view of the fiber optic splitter module of FIG. 20.

Cover 96 is mounted to main housing portion 94 by fasteners (not shown) through fastener mounts 110 defined on main housing portion 94. Cover 96 extends beyond first transverse sidewall 98 to form a top mounting flange 44 and a bottom mounting flange 46 of splitter module 14. Referring to FIGS. 23, 25, and 26, as discussed previously, bottom flange 46 of splitter module housing 92 and the corresponding slot 42 on chassis 12 are smaller in size than top flange 44 and the corresponding top slot 40 on chassis 12. Bottom slot 42 is sized so that, while bottom flange 46 may be received within slot 42, the larger top flange 44 will not fit. This ensures that modules 14 are positioned within front opening 30 in a particular desired orientation. Similar flanges are described in commonly-owned U.S. Pat. No. 5,363,465, issued Nov. 8, 1994, entitled FIBER OPTIC CONNECTOR MODULE, the disclosure of which is incorporated herein by reference. In this manner, fiber optic modules 14 are oriented correctly to be coupled to adapter assemblies 16 mounted adjacent rear 28 of chassis 12 at each mounting location 38.

Rear wall 104 of main housing portion 94 includes a curved portion 112 configured to provide bend radius protection to cables within interior 114. Rear wall 104 of main housing 92 also includes an inset portion 116. A pair of fiber optic connectors 118 positioned at inset portion 116 protrude rearwardly from rear wall 104 for mating with fiber optic adapters 64 of adapter assemblies 16 mounted within chassis 12.

As shown in FIGS. 5 and 6, front wall 106 of module main housing 94 is angled with regard to front opening 30 of chassis 12, which may aid in the direction of cables exiting module 14 toward a desired location. In other embodiments, front walls 106 could be made generally parallel to front 32 of chassis 12 within the scope of the present disclosure.

Figure 22:
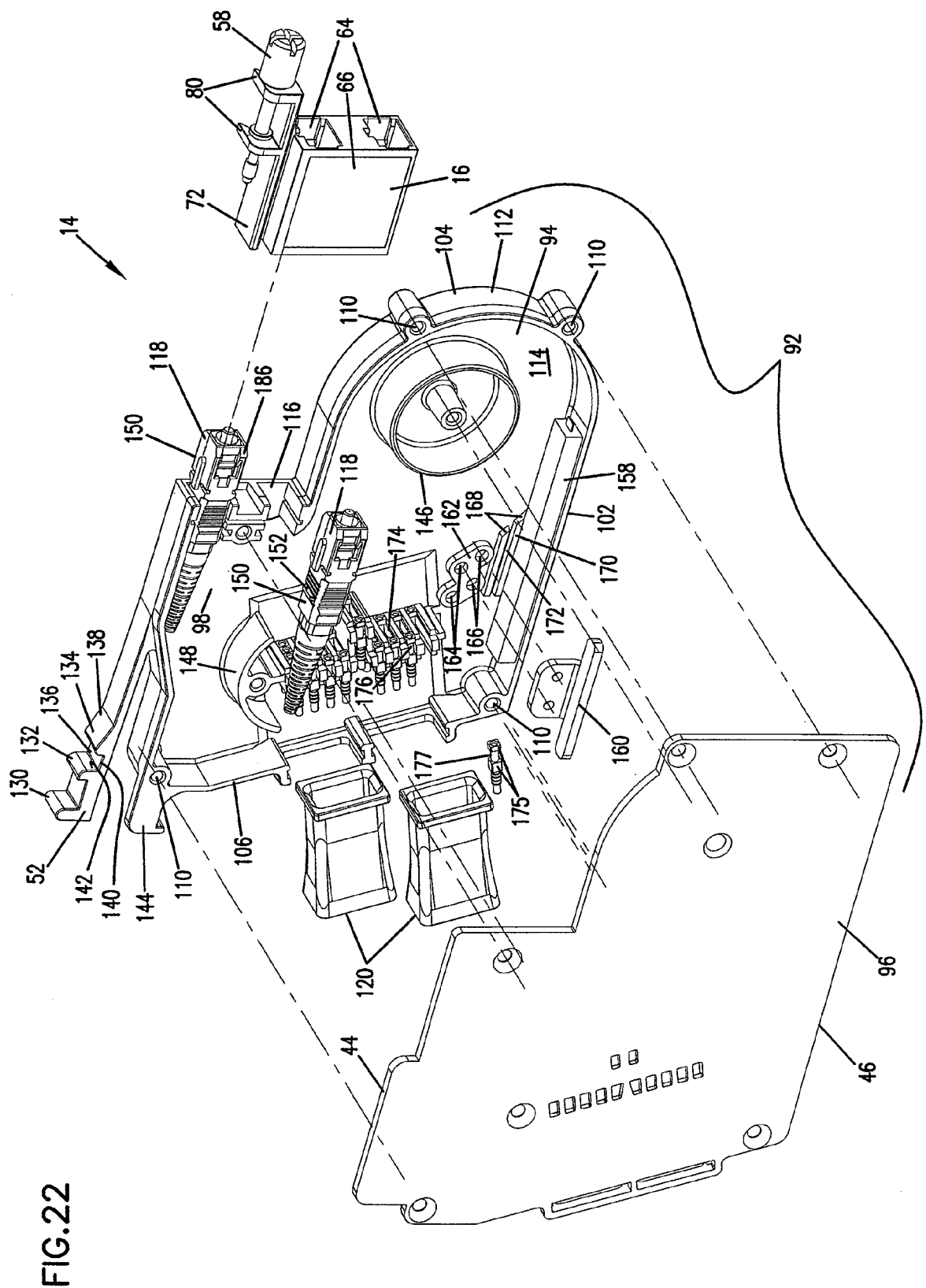
FIG. 22 is an exploded view of the fiber optic splitter module of FIG. 16, shown with the adapter assembly exploded from the fiber optic splitter module.

Each module 14 includes two cable exits 120 extending from front wall 106 of module main housing 94. As shown in FIG. 22, cable exits 120 are slidably mounted to main housing 94 of module 14 and captured by cover 96 of module 14 when cover 96 is mounted to main housing 94. Cable exits 120 define a protruding rear lip 122 that is slidably inserted into slots 124 defined around front apertures 126 for accommodating cable exits 120. Cover 96 also includes slits 128 that receive rear lips 122 of the cable exits 120 to capture cable exits 120. Cable exits 120 permit telecommunications cables within module 14 to be directed outside of module 14. Cable exits 120 are preferably sized thin enough to fit within the profile of the fiber optic splitter module 14, as shown in FIG. 25, to preserve the density of the telecommunications assembly 10.

Main housing 94 includes an integrally formed flexible latch 52 (i.e., cantilever arm) that is adapted to engage a portion of chassis 12 to hold module 14 within front opening 30 of chassis 12. Flexible latch 52 also deflects to permit withdrawal of module 14 from chassis 12.

Still referring to FIGS. 20-30, latch 52 of module 14 includes a finger grip tab 130, a front latching tab 132 and a rear latching tab 134. Front latching tab 132 and rear latching tab 134 define a recess 136 therein between. Rear latching tab 134 includes a ramped face 138 that causes latch 52 to elastically deflect down when module 14 is being inserted into chassis 12. Rear latching tab 134 also includes a square face 140 that opposes a square face 142 of front latching tab 132.

Front lip 50 of bulkhead 48 at mounting location 38 of chassis 12 is captured in recess 136 between the two latching tabs 132, 134 to hold module 14 in place within chassis 12. During insertion, as front lip 50 of bulkhead 48 clears ramped rear tab 134 and is captured in recess 136 between the two latching tabs 132, 134, latch 52 flexes back upwardly. Recess 136 between the two tabs 132, 134 of latch 52 allows for a certain amount of horizontal float for splitter module 14 within chassis 12, as will be discussed in further detail below.

The removal of module 14 from chassis 12 is performed by pressing latch 52 downwardly to clear the square face 140 of rear tab 134 from lip 50 and sliding module 14 away from chassis 12. Module 14 includes a fixed grip tab 144 opposing and adjacent to flexible latch 52 to aid removal of module 14 from chassis 12. Fixed grip tab 144 is formed as a part of front wall 106 of module 14. Fixed grip tab 144 is preferably positioned on module 14 opposite latch 52 so that a user may apply opposing force on latch 52 and fixed grip tab 144 to securely grasp module 14 and remove it from chassis 12. Fixed grip tab 144 is preferably positioned on module 14 close enough to latch 52 so that a user may be apply the force with two adjacent fingers of the hand.

FIG. 22 shows an exploded view of fiber optic splitter module 14 illustrating the internal components of module 14. Fiber optic splitter module 14 is shown in FIG. 22 with adapter assembly 16 exploded from module 14.

Within interior 114 of main housing 94, splitter module 14 includes a first radius limiter 146 adjacent curved portion 122 of rear wall 104 of main housing 94. Splitter module 14 includes a second radius limiter 148 adjacent front wall 106 of housing 94 near cable exits 120. Connectors 118 of splitter module 14 are slidably inserted into opposing slots 154 formed in apertures 156 at the rear wall 104. Connectors 118 project out from rear wall 104 at inset portion 116 of rear wall 104. Outer housings 150 of connectors 118 include transverse flanges 152 that are received within the opposing slots 154 formed in apertures 156 that accommodate the connectors 118. Once slidably inserted, connectors 118 are captured within housing 92 by cover 96.

Adjacent bottom wall 102 of main housing 94 within interior 114 is an optical component 158 such as a fiber optic splitter or a fan-out. Optical component 158 is held against the interior of bottom wall 102 by a clamp 160 (i.e., bracket). Clamp 160 is mounted to a clamp mount 162 defined on splitter module main housing 94 with fasteners (not shown). In the embodiment of the housing 94 shown in the FIGS., clamp mount 162 includes two pairs of mounting holes 164, 166. Either the upper set of holes 164 or the lower set of holes 166 are utilized depending upon the size of the clamp that will be used to hold optical component 158 against bottom wall 102. It should be noted that different optical components may have different thicknesses and may require the use of different sized clamps for holding the optical components in place. In certain embodiments, two optical components that are stacked on top of another may be used, in which case, a smaller clamp would be used to hold the two optical components in place.

Optical component 158 is offset from the interior side of first transverse sidewall 98 by a set of cable management structures 168. In the embodiment of the module 14 illustrated, the set of cable management structures 168 are elongate structures 170 defining cable management slits 172 therein between. When optical component 158 is held in place, cables can be routed through slits 172 between optical component 158 and the interior of first transverse wall 98 (please see FIGS. 29 and 30).

Splitter module main housing 94 also includes integrally formed crimp holders 174 (e.g., slots) adjacent front wall 106 of housing 94 underneath second radius limiter 148. Crimp elements 176 crimped to the ends of cables that are split by optical component 158 are slidably received into crimp holders 174 as shown in FIGS. 22 and 29. Crimp elements 176 define square flanges 175 between which is defined a recessed portion 177. The crimp holders 174 include complementary structure to the crimp elements such that once the crimp elements 176 are slidably inserted into the crimp holders 174, the crimp elements 176 are prevented from moving in a longitudinal direction due to the flanges 175. Once slidably inserted, crimp elements 176 are held in place by cover 96 that is mounted to splitter module main housing 94. In the embodiment shown, there are nine crimp holding slots 174, each one being able to accommodate up to four crimp elements 176. Other numbers are possible. Other complementary shapes between the crimp elements and the crimp holding slots are also possible to provide a slidable fit and to prevent axial movement of the crimp elements once inserted therein the crimp holders.

FIG. 29 shows fiber optic splitter module 14 without a cover 96 exposing the interior features of fiber optic splitter module 14 including routing of a fiber optic cable within fiber optic splitter module 14. FIG. 30 illustrates a cross-sectional view taken along section line 30-30 of FIG. 29.

As shown in FIG. 29, a first cable 178 extends from connector 118 toward optical component 158, mounted within module housing 92. Optical component 158, as previously discussed, may be a splitter or a fan-out or another type of optical component. In the embodiment shown, optical component 158 is a fiber optic splitter that splits the signal of a single strand to a plurality of secondary signals. In another embodiment, first cable 178 may be a multi-strand fiber cable with a plurality of strands of optical fiber and optical component may be a fanout to separate the individual strands into each of a plurality of second cables.

First cable 178, as it extends toward optical component 158, is inserted through slits 172 (see FIGS. 22, 29, and 30) located between optical component 158 and the inner side of first transverse sidewall 98 of module housing 94 and looped around first radius limiter 146 and then around second radius limiter 148 before being received by optical component 158. Second cables 180 extend from optical component 158 and are looped again all the way around first radius limiter 146 before heading toward crimp holders 174. From crimp holders 174, cables (not shown) crimped to the other ends of the crimps 176 exit the module through module exits 120.

An outside cable (not shown) may extend to rear end 70 of an adapter 64 of adapter assembly 16 and be terminated by a connector (not shown in FIG. 29) that is optically connected to connector 118 of module 14 through adapter 64 once module 14 is inserted within chassis 12. It should be noted that the routing of the fiber optic cables within module 14 as shown in FIGS. 29 and 30 is only one example and other ways of routing the cables within the module are possible.

The embodiment of the fiber optic splitter module 14 shown in the FIGS. is configured such that it can accommodate reduced bend radius fiber. A reduced bend-radius fiber may have a bend radius of about 15 mm whereas a non-reduced bend-radius fiber may have a bend radius of about 30 mm.

Similar fiber optic splitter modules are described in commonly-owned U.S. patent application Ser. Nos. 10/980,978 (filed Nov. 3, 2004, entitled FIBER OPTIC MODULE AND SYSTEM INCLUDING REAR CONNECTORS); 11/138,063 (filed May 25, 2005, entitled FIBER OPTIC SPLITTER MODULE); 11/138,889 (filed May 25, 2005, entitled FIBER OPTIC ADAPTER MODULE); and 11/215,837 (filed Aug. 29, 2005, entitled FIBER OPTIC SPLITTER MODULE WITH CONNECTOR ACCESS), the disclosures of which are incorporated herein by reference.

The insertion of a splitter module 14 into chassis 12 is illustrated in FIGS. 31-35. Referring to FIGS. 31-35, insertion of fiber optic module 12 into front opening 30 of chassis 12 begins the mating of module 14 to chassis 12 and to adapters 64 of adapter assembly 16. Top flanges engage 44 top slots 40 and bottom flanges 46 engages bottom slots 42 of chassis 12 as module 14 is inserted.

Still referring to FIGS. 31-35, chassis 12 includes a flexible shield 182 in each mounting location 38. Shield 182 is adapted to prevent protection against accidental exposure to light. Shield 182 is positioned in front end 68 of each adapter 64 of adapter assembly 16. Before a splitter module 14 is placed in an associated mounting location 38, if a connectorized cable that is connected to an adapter 64 of adapter assembly 16 is illuminated and transmitting light signals, shield 182 will prevent accidental exposure to these signals which might damage eyes or other sensitive organs, or nearby communications equipment. The insertion of splitter module 14 pushes shield 182 out of the way as illustrated in FIGS. 31-33.

Shield 182 is deflected by module 14 as module 14 is inserted through front opening 30 so that connectors 118 of module 14 can mate with adapters 64 of adapter assemblies 16. Shield 182 is preferably made of a resilient deformable material that will return to the position when module 14 is withdrawn from mounting location 38.

Figure 34:
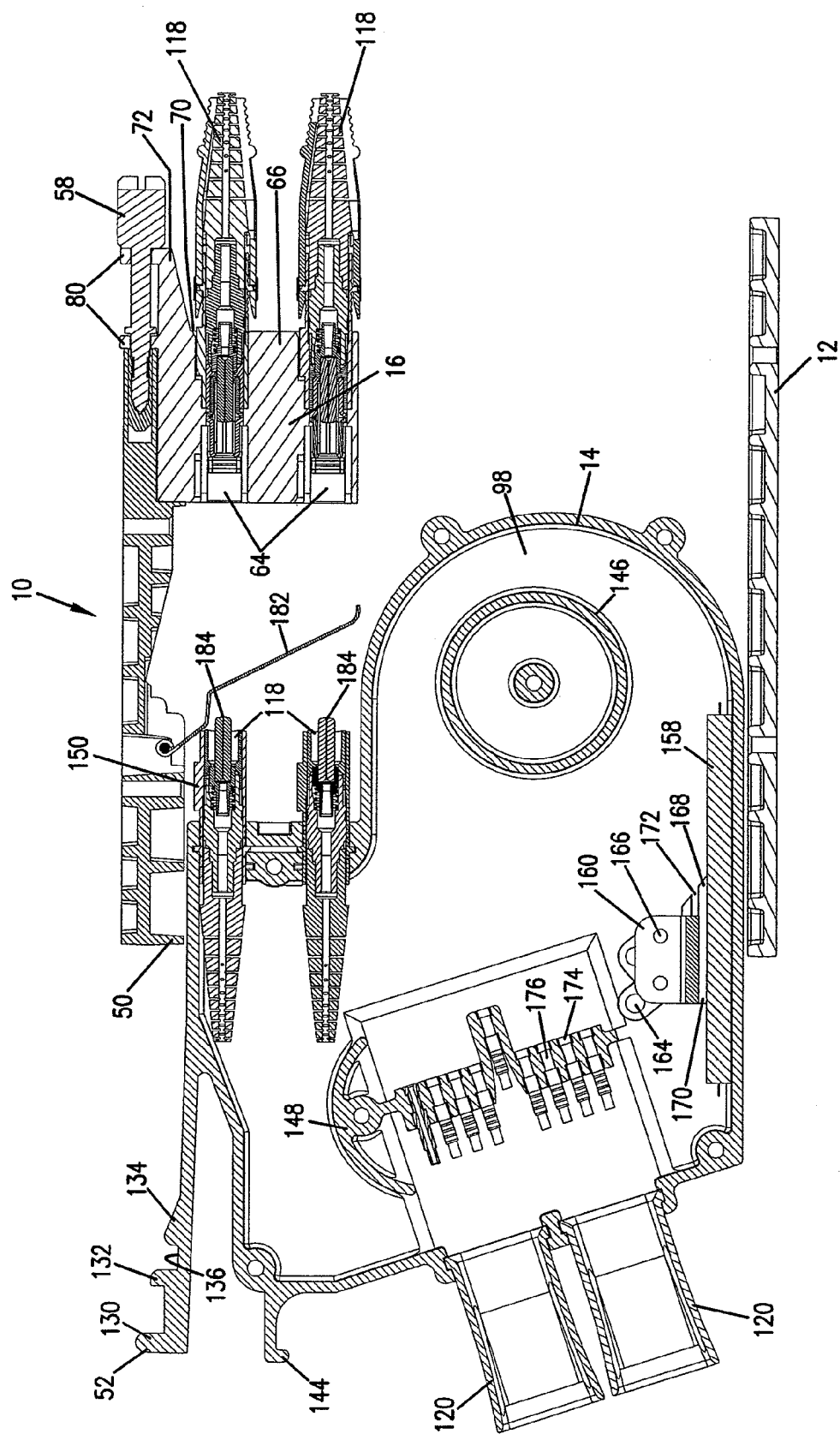
FIG. 34 is a side cross-sectional view of the fiber optic splitter module of FIG. 32 within the chassis, taken through the center of the fiber optic splitter module.

For example, in FIG. 31, a fiber optic splitter module 14 is shown partially inserted within chassis 12 prior to connectors 118 of splitter module 14 having contacted shield 182 of chassis 12. In FIG. 32, fiber optic splitter module 14 is shown in a position within chassis 12 with connectors 118 of fiber optic splitter module 14 making initial contact with shield 182 of chassis 12 to move shield 182 out of the way (a side cross-sectional view is shown in FIG. 34). In FIG. 33, fiber optic splitter module 14 is shown in a fully inserted position within chassis 12, having moved shield 182 out of the way (a side cross-sectional view is shown in FIG. 35).

Shield 182 is configured such that shield 182 does not engage the ferrule 184 of connector 118 of splitter module 14 when connector 118 contacts shield 182 to move it out of the way. Instead, outer connector housing 150 pushes shield 182 out of the way.

Shield 182 may be connected to chassis 12 by fasteners, or, alternatively, shield 182 may be formed integrally with chassis 12 or mounted by spot-welding or other fastening techniques.

As shield 182 is fully deflected, further insertion of module 14 brings connectors 118 into contact with adapters 64 and connectors 118 are received within front ends 68 of adapters 64. Latch 52 is deflected inwardly as module 14 is inserted and then flexes back so that front lip 50 of bulkhead 48 is captured in recess 136. Module 14 is now in position to process and transmit signals from cable through first cable 178, optical component 158 and second cable 180 within module interior 114.

Referring to FIG. 35, as noted above, recess 136 between the two tabs 132, 134 of latch 52 provides a certain amount of horizontal float for the splitter module 14 within chassis 12. Front lip 50 of bulkhead 48 is allowed to move a distance of D as indicated in FIG. 35 before it makes contact with square face 140 of rear tab 134. Splitter module 14 is configured such that, when splitter module 14 is pulled away from front 32 of chassis 12, distance D front lip 50 of bulkhead 48 travels before contacting square face 140 of rear tab 134 is less than the horizontal float (i.e., distance A) provided for adapter assembly 16, as discussed before.

In this manner, splitter module 14 provides a form of protection from accidentally disengaging connectors 118 of the module from adapter assemblies 16 at rear 28 of chassis 12. The size of recess 136 of module 14 is configured such that the horizontal float of splitter module 14 is interrupted before the adapter assembly 16 can be pulled far enough toward the front of chassis 12 to stop its horizontal movement and accidentally disengage connectors 118 of module 14 from adapters 64.

Figure 39:
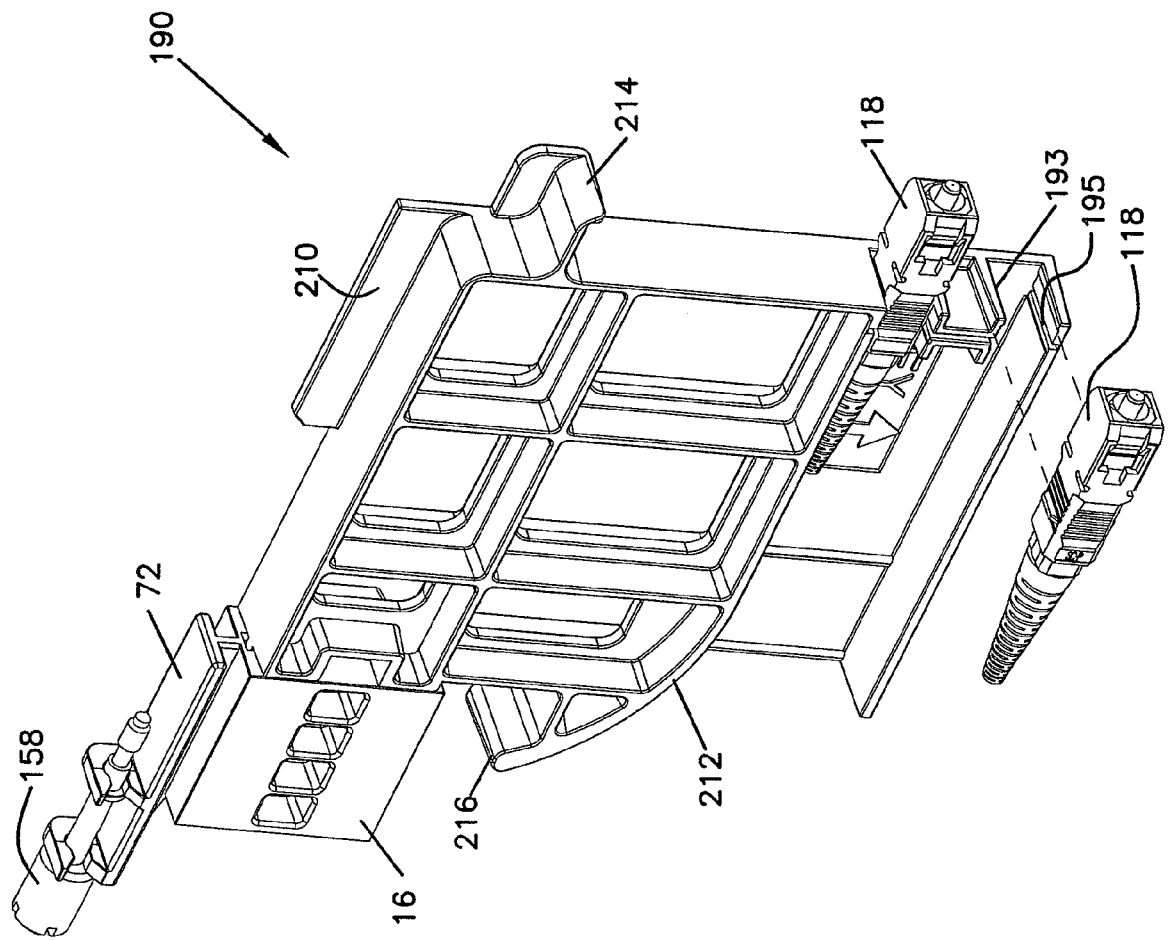
FIG. 39 is a front perspective view of the dust cap/test tool of FIG. 36 shown with the adapter assembly mounted thereon and shown with one of the testing connectors of the dust cap/test tool exploded off the dust cap/test tool.
Figure 40:
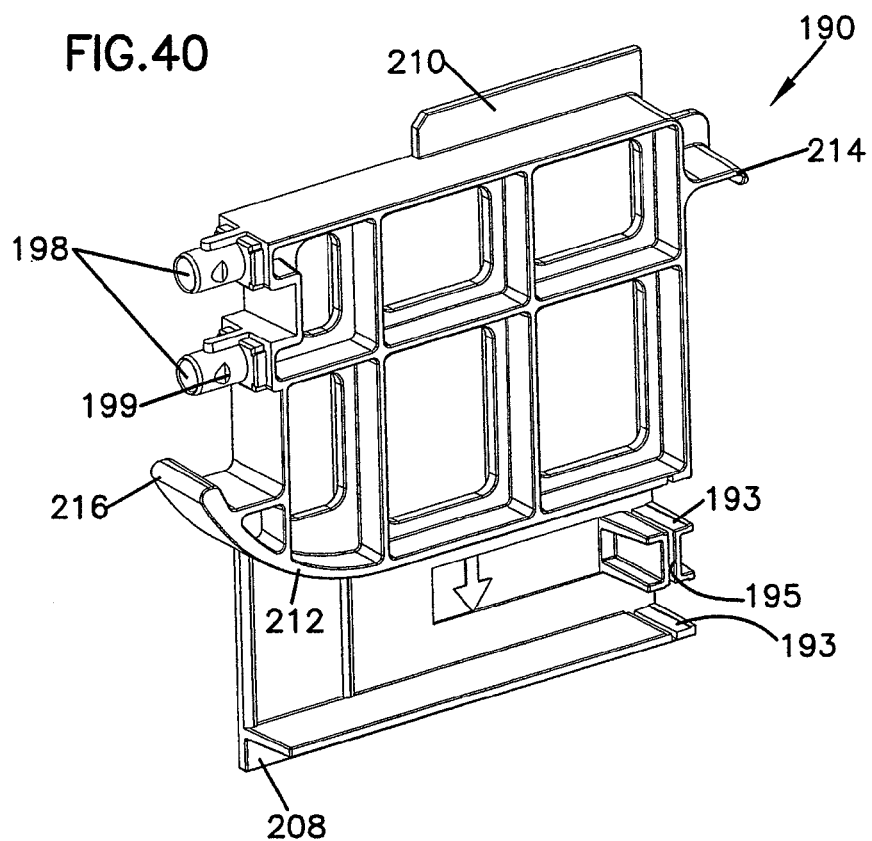
FIG. 40 is a rear perspective view of the dust cap/test tool of FIG. 36, shown without the testing connectors of the dust cap/test tool.
Figure 41:
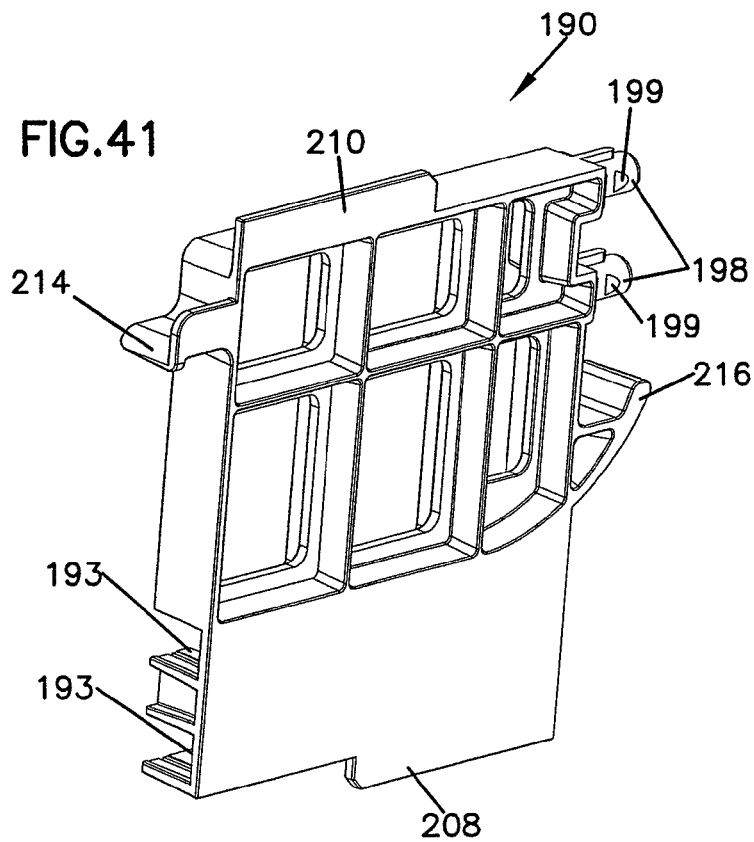
FIG. 41 is a front perspective view of the dust cap/test tool of FIG. 40.
Figure 45:
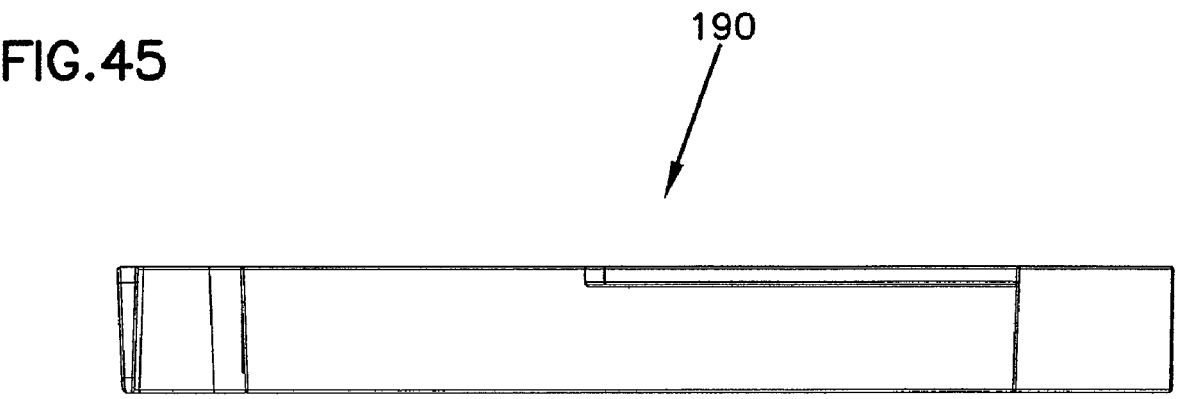
FIG. 45 is a top view of the dust cap/test tool of FIG. 40.
Figure 46:
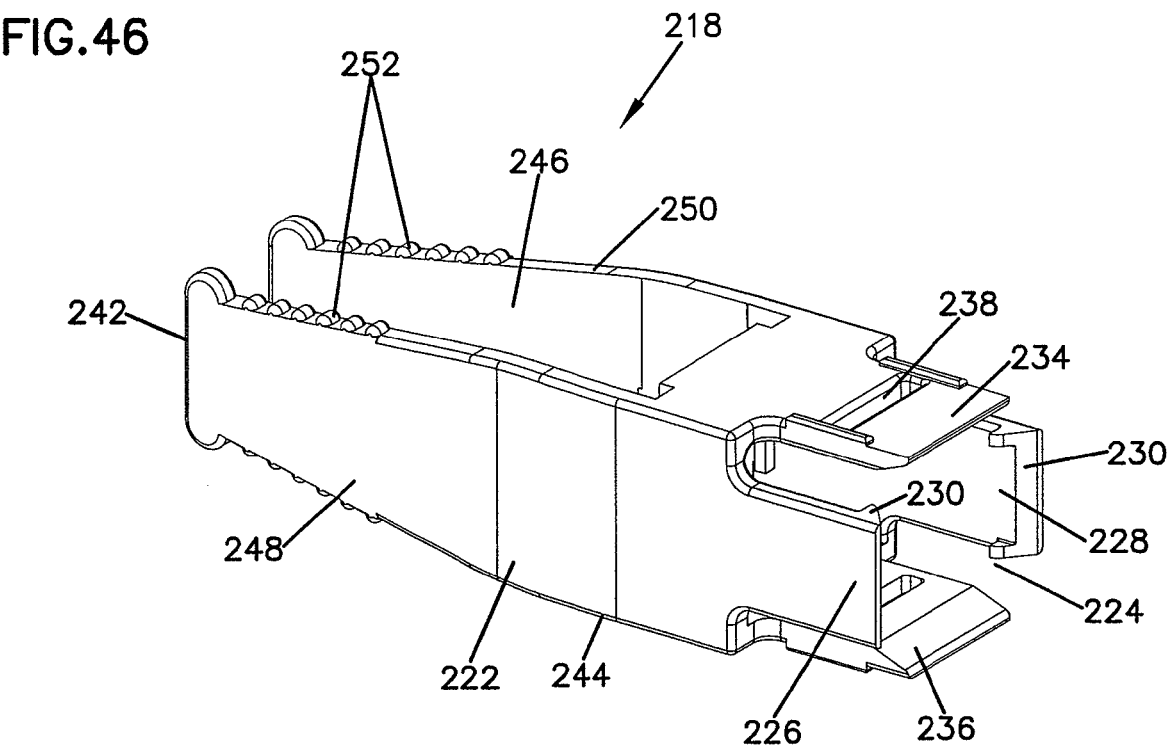
FIG. 46 is a bottom front perspective view of a grip extension according to the invention.
Figure 47:
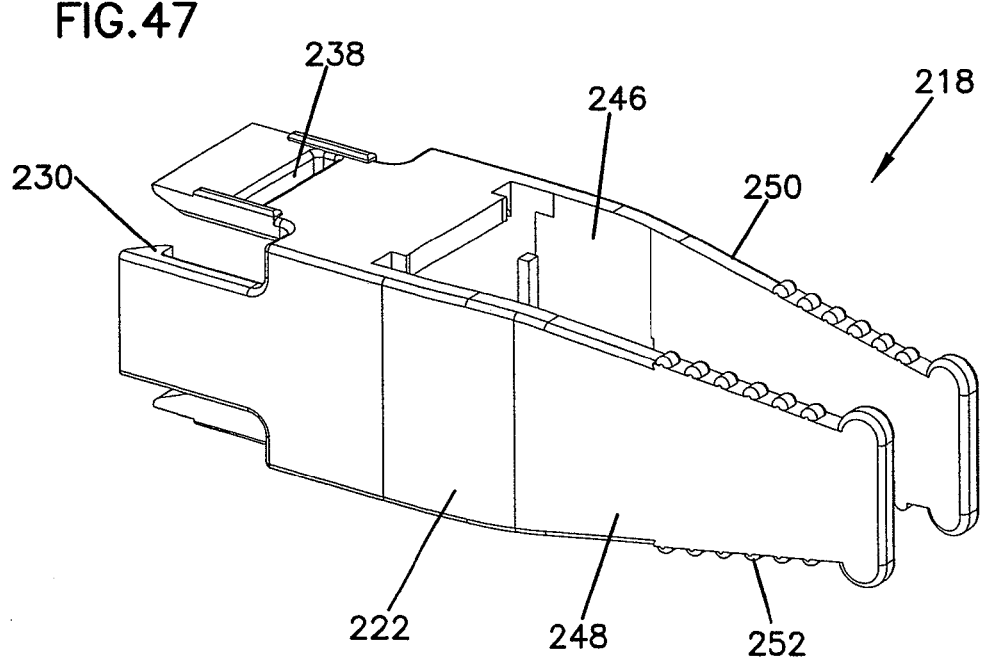
FIG. 47 is a bottom rear perspective view of the grip extension of FIG. 46.
Figure 48:
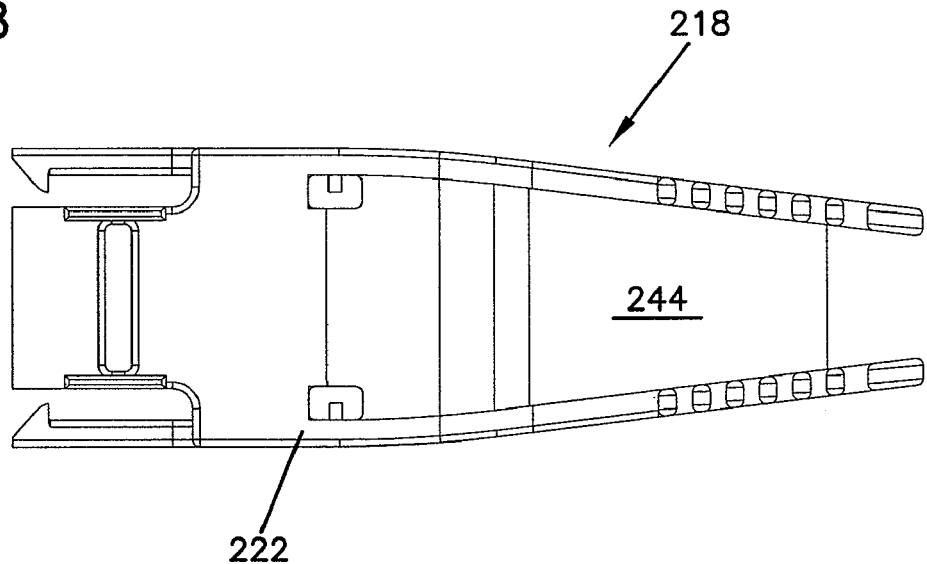
FIG. 48 is a bottom view of the grip extension of FIG. 46.
Figure 49:
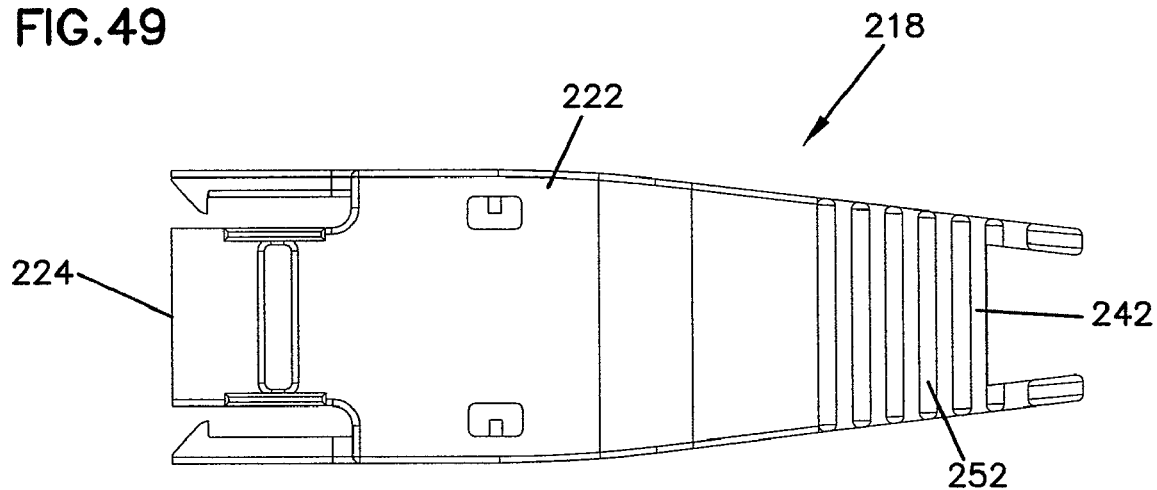
FIG. 49 is a top view of the grip extension of FIG. 46.
Figure 50:
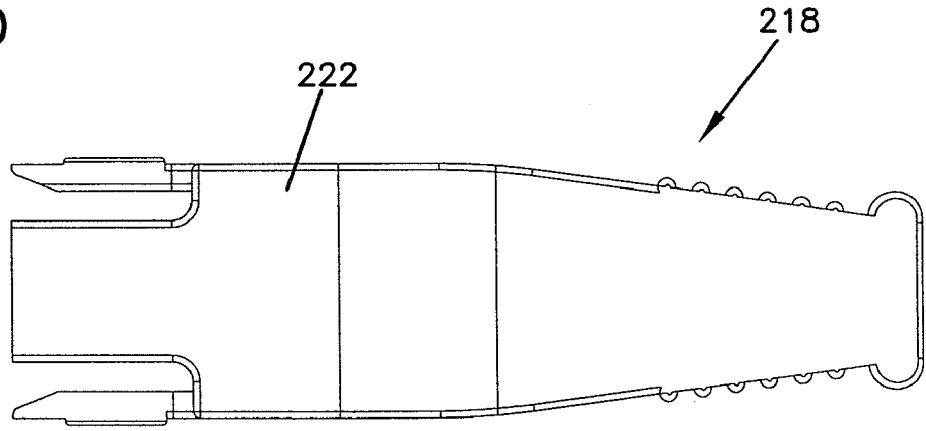
FIG. 50 is a right side view of the grip extension of FIG. 46.
Figure 52:
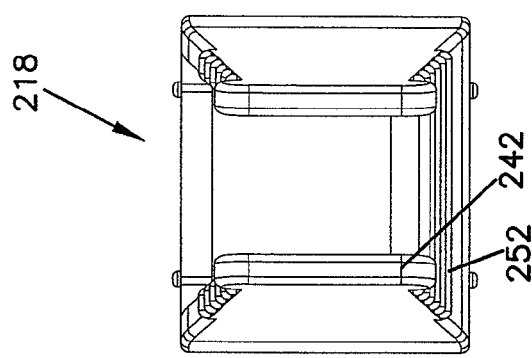
FIG. 52 is a rear view of the grip extension of FIG. 46.
Figure 51:
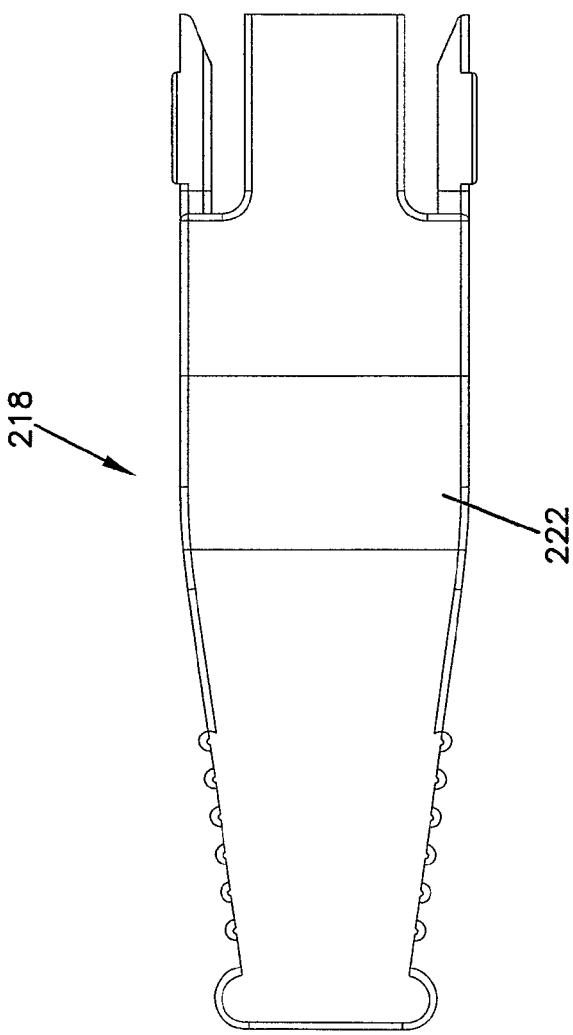
FIG. 51 is a left side view of the grip extension of FIG. 46.

FIGS. 36-45 illustrate a dust cap/test tool 190 configured for use with adapter assembly 16 of telecommunications assembly 10. Dust cap/test tool 190 includes a body 192 with a front end 194 and a rear end 196. Dust cap/test tool 190 includes a pair of connectors 118 protruding out from front end 194. As shown in FIG. 39, the pair of connectors 118 are slidably inserted into connector holders 193 of the body 192 of dust cap/test tool 190. Connector holders 193 include slots 195 for receiving flanges of outer housings of connectors 118, as in housing 94 of splitter module 14. Dust cap/test tool 190 also includes a pair of dust plugs 198 protruding out from rear end 196. Dust cap/test tool 190 includes a top wall 200 and a bottom wall 202 and a first transverse side 204 and a second transverse side 206. The top and the bottom walls 200, 202 include top and bottom flanges 208, 210, respectively, for slidable insertion into chassis 12 similar to fiber optic splitter module 14. First transverse side 204 includes a radius limiter 212 for guiding cables terminated to connectors 118 of dust cap/test tool 190. There is a first grip 214 integrally formed with body 192 at front end 194. There is a second grip 216 defined at the end of the radius limiter 212 integrally formed with body 192 at rear end 196 of dust cap/test tool 190.

As shown in FIGS. 36 and 37, dust cap/test tool 190 is slidably insertable within chassis 12 and usable in two different ways. In FIG. 36, dust cap/test tool 190 is shown being used as a test tool to test the optical signals input into the adapter assemblies 16. Since adapter assemblies 16 are located at rear end 28 of chassis 12 and front ends 68 of adapters 64 of adapter assemblies 16 are located in the interior of chassis 12 at rear 28, it becomes difficult to access to the connections for testing or other purposes. The pair of connectors 118 on front end 194 of dust cap/test tool 190 are designed to be coupled to adapters 64 of adapter assembly 16 when dust cap/test tool 190 is slidably inserted into chassis 12. In this manner, the connections at adapter assemblies 16 can be tested without having to uncouple adapter assemblies 16 from chassis 12 and without having to reach into chassis 12.

As shown in FIG. 37, dust cap/test tool 190 can also be flipped around 180° and used as a dust cap to seal the interior of adapters 64 from contaminants. If a splitter module 14 is not inserted within one of the mounting locations 38 of chassis 12, dust cap/test tool 190 can act as a placeholder and be slidably inserted within chassis 12. The dust plugs 198 include recessed portions 199 for receiving protruding tabs 89 of arms 91 of housing halves at the interior of an adapter 64. The recessed portions 199 help retain the dust plugs 198 within the adapters 64.

In FIG. 38, dust cap/test tool 190 is shown in combination with an adapter assembly 16 exploded off. In FIG. 39, dust cap/test tool 190 is shown with an adapter assembly 16 mounted thereon and shown with one of the testing connectors 118 of dust cap/test tool 190 exploded off dust cap/test tool 190.

FIGS. 46-52 illustrate a grip extension 218 adapted for use with connectors 118 coupled to rear 70 of adapters 64 of adapter assembly 16. Grip extension 218 is designed to add length to the outer housing 150 of a connector 118 to facilitate access to individual connectors 118 in dense environments such as the telecommunications assembly 10. Grip extension is preferably first mounted over a cable before the cable is terminated to a connector 118. Once the connector 118 is terminated to the cable, grip extension 218 is slid over the boot portion 220 of the connector and mounted to the outer housing 150 of connector 118 as shown in FIG. 7.

Referring to FIGS. 46-52, grip extension 218 includes an elongate body 222 with four cantilever arms extending from a front portion 224 of the body 222. Two of the opposing cantilever arms 226, 228 include protruding tabs 230 for engagement with the gripping surface 232 of outer housing 150 of connectors 118. Two of the other opposing cantilever arms 234, 236 include slits 238 for engaging the flanges 240 defined on connector outer housings 150. With the four cantilever arms 226, 228, 234, 236, the grip extensions 218 are snap-fit onto connector housings 150. The rear portion 242 of the grip extension body 222 includes a top side 244, an open bottom side 246 and two transverse sides 248, 250 that taper in going in a direction from the front 224 to the back 242. Top and bottom sides 244, 246 include grip structures 252 to facilitate pulling on grip extensions 218 to remove connectors 118.

The above specification, examples and data provide a complete description of the manufacture and use of the invention. Since many embodiments of the invention can be made without departing from the spirit and scope of the invention, the invention resides in the claims hereinafter appended.

What is claimed is:

1. A fiber optic telecommunications chassis comprising:
a front opening and a rear opening opposite the front opening;
a plurality of mounting locations defined for telecommunications modules to be inserted through the front opening; and
each mounting location including an adapter assembly removably mounted within the chassis through the rear opening, each adapter assembly including a unitary body with a housing portion and a mounting portion that are formed as an integral unit, the unitary body defining a longitudinal axis, the housing portion defining at least one fiber optic adapter formed as an integral unit with the housing portion, the housing portion defining a top, a bottom, and first and second transverse sides extending between the top and the bottom, each fiber optic adapter of the housing portion including a front opening for receiving a first fiber optic connector projecting from one of the telecommunications modules to be inserted through the front opening of the chassis, a rear opening for receiving a second fiber optic connector adapted to mate with the first fiber optic connector, and a side opening for receiving a ferrule alignment sleeve and inner housing components, the housing portion including a panel closing off the side opening of at least one of the fiber optic adapters for holding the ferrule alignment sleeve and the inner housing components within the fiber optic adapter, the mounting portion configured to mount the unitary body to the chassis, the mounting portion including a mounting slide for slidably guiding the adapter assembly into the chassis, the mounting slide formed as an integral unit with the top of the housing portion and extending along the longitudinal axis of the unitary body, the mounting portion defining a flange that extends away from the mounting slide in a direction opposite the housing portion, the flange for mounting the adapter assembly to the chassis.

2. A fiber optic telecommunications chassis according to claim 1, wherein the chassis includes a plurality of the telecommunications modules mounted to the chassis, each module mounted at one of the mounting locations.

3. A fiber optic telecommunications chassis according to claim 1, wherein two fiber optic adapters are included in the housing portion.

4. A fiber optic telecommunications chassis according to claim 1, wherein the flange defines a face that extends perpendicular to the longitudinal axis.

5. A fiber optic telecommunications chassis according to claim 1, wherein the flange includes a releasable fastener for mounting the adapter assembly to the chassis.

6. A fiber optic telecommunications chassis according to claim 5, wherein the releasable fastener is a thumbscrew captively held by the flange.

7. A fiber optic telecommunications chassis according to claim 1, wherein the chassis includes a first major side, a second major side, and a pair of opposing transverse sides extending between the major sides defining an interior communicating with the front opening and the rear opening, wherein the mounting locations are configured to orient the telecommunications modules inserted through the front opening generally parallel to one of the transverse sides.

* * * * *